(12) United States Patent
Kato et al.

(10) Patent No.: US 7,408,663 B2
(45) Date of Patent: Aug. 5, 2008

(54) COMMUNICATION SYSTEM

(75) Inventors: Tokunori Kato, Ichinomiya (JP); Hisao Sugiura, Seto (JP); Susumu Chida, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 969 days.

(21) Appl. No.: 10/396,422

(22) Filed: Mar. 26, 2003

(65) Prior Publication Data

US 2003/0231361 A1   Dec. 18, 2003

(30) Foreign Application Priority Data

Mar. 28, 2002   (JP)   ............... 2002-090273

(51) Int. Cl.
  *G06F 15/00*   (2006.01)
  *H04N 1/46*   (2006.01)
  *B41J 32/00*   (2006.01)
  *B41J 29/393*   (2006.01)

(52) U.S. Cl. .................. 358/1.15; 358/500; 358/501; 347/214; 347/19; 400/249; 400/703

(58) Field of Classification Search ............... 358/1.15, 358/400, 402, 408, 440, 468, 1.14, 500, 501; 347/214, 217, 19; 400/207, 249, 70, 703; 399/111, 12, 25
See application file for complete search history.

(56) References Cited

U.S. PATENT DOCUMENTS

| | | | | |
|---|---|---|---|---|
| 5,065,254 | A * | 11/1991 | Hishida | 358/400 |
| 6,000,868 | A * | 12/1999 | Watanabe et al. | 400/208 |
| 6,351,621 | B1 | 2/2002 | Richards et al. | |
| 6,497,469 | B1 * | 12/2002 | Shinada et al. | 347/19 |
| 6,522,348 | B1 * | 2/2003 | Brot et al. | 347/214 |
| 6,665,425 | B1 * | 12/2003 | Sampath et al. | 382/112 |
| 6,694,884 | B2 * | 2/2004 | Klinefelter et al. | 101/484 |
| 6,748,182 | B2 | 6/2004 | Yoshida et al. | |
| 6,798,434 | B2 * | 9/2004 | Shibata et al. | 347/214 |
| 2002/0030714 | A1 * | 3/2002 | Walker | 347/19 |
| 2002/0077979 | A1 | 6/2002 | Nagata | |
| 2003/0002074 | A1 * | 1/2003 | Miyano | 358/1.15 |
| 2004/0051887 | A1 * | 3/2004 | Nishide et al. | 358/1.9 |

FOREIGN PATENT DOCUMENTS

JP   A 11-243465   9/1999

(Continued)

OTHER PUBLICATIONS

U.S. Appl. No. 10/396,375, filed Mar. 26, 2003, Chida.

(Continued)

*Primary Examiner*—David K Moore
*Assistant Examiner*—Charlotte M Baker
(74) *Attorney, Agent, or Firm*—Oliff & Berridge, PLC

(57) ABSTRACT

In a communication system, a call center is connectable via a communication line to a facsimile apparatus having a printing function. The facsimile apparatus reads ribbon-ID data of an ink ribbon mounted therein, and sends the read ribbon-ID data to the center device. The call center receives the ribbon-ID data from the facsimile apparatus, judges whether or not the ribbon-ID data is valid, and returns a result of the judgment to the facsimile apparatus.

13 Claims, 19 Drawing Sheets

FOREIGN PATENT DOCUMENTS

| | | |
|---|---|---|
| JP | A 2000-141628 | 5/2000 |
| JP | A 2000-158777 | 6/2000 |
| JP | A 2000-207970 | 7/2000 |
| JP | A 2001-105625 | 4/2001 |
| JP | A 2002-62769 | 2/2002 |
| JP | A 2002-108147 | 4/2002 |
| JP | A 2002-202697 | 7/2002 |
| JP | A 2002-318511 | 10/2002 |
| JP | A 2003-122204 | 4/2003 |

OTHER PUBLICATIONS

U.S. Appl. No. 10/395,141, filed Mar. 25, 2003, Isozaki et al.

* cited by examiner

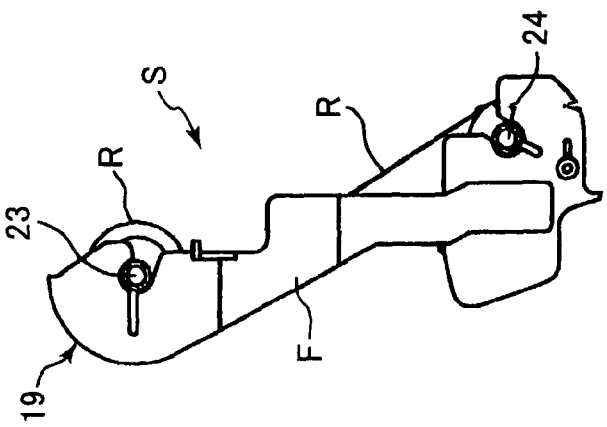
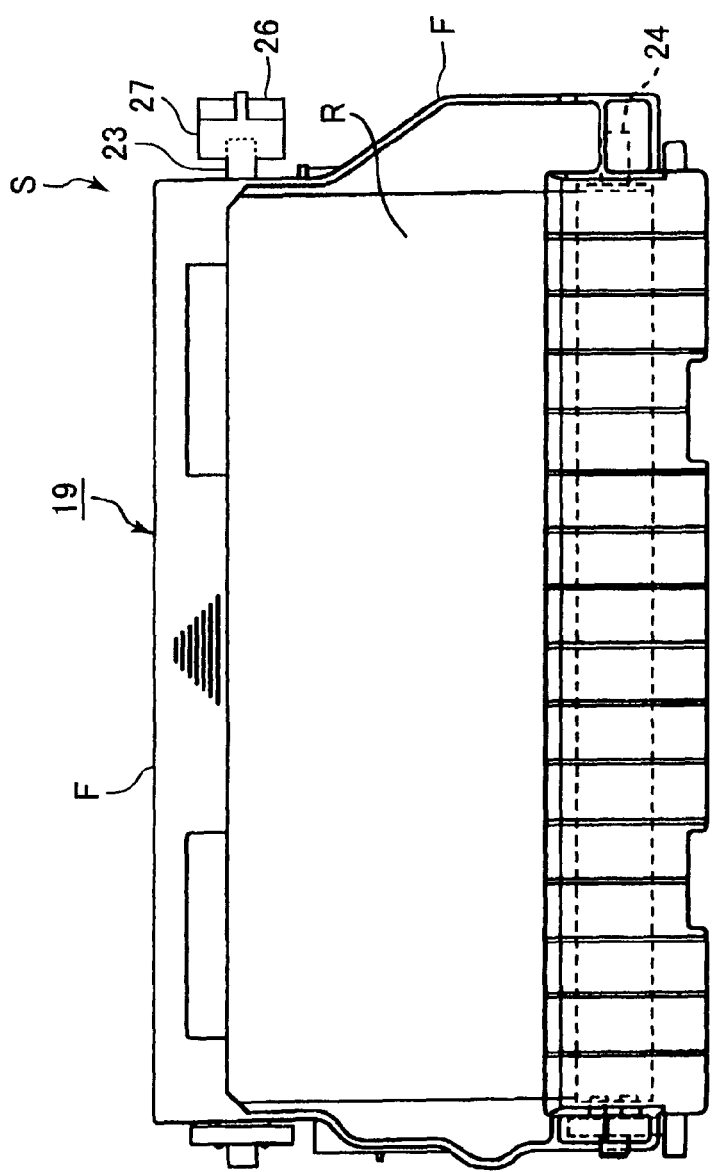

FIG.10

| RIBBON-ID | INVALID FLAG |
|---|---|
| 100012345 | 0 |
| 100012346 | 1 |
| 100012347 | 0 |
| 100012348 | 0 |
| 100012349 | 0 |
| 100012350 | 0 |
| 100012351 | 0 |
| 100012352 | 0 |
| 100012353 | 0 |
| 100012354 | 0 |
| 100012355 | 0 |
| 100012356 | 0 |
| 100012357 | 0 |
| 100012358 | 0 |
| 100012359 | 0 |
| 100012360 | 0 |
| 100012361 | 1 |
| 100012362 | 0 |
| 900023456 | 1 |
| 992345678 | 0 |

| RIBBON-ID | ACCESS COUNT | INVALID FLAG |
|---|---|---|
| 100012345 | 0 | 0 |
| 100012346 | 3 | 1 |
| 100012347 | 0 | 0 |
| 100012348 | 0 | 0 |
| 100012349 | 0 | 0 |
| 100012350 | 0 | 0 |
| 100012351 | 0 | 0 |
| 100012352 | 2 | 0 |
| 100012353 | 1 | 0 |
| 100012354 | 0 | 0 |
| 100012355 | 0 | 0 |
| 100012356 | 0 | 0 |
| 100012357 | 0 | 0 |
| 100012358 | 0 | 0 |
| 100012359 | 1 | 0 |
| 100012360 | 0 | 0 |
| 100012361 | 3 | 1 |
| 100012362 | 0 | 0 |
| 900023456 | 3 | 1 |
| 992345678 | 2 | 0 |

FIG.17

| DATE AND TIME | SENDER TELEPHONE NUMBER | SENDWE NAME | COUNTRY DATA | MODEL DATA | IP ADDRESS |
|---|---|---|---|---|---|
| 2002/10/1 00:00 | 052824**** | MODEL 1 | 47 | 10 | 10. 134. 43. *** |
| 2001/10/2 00:00 | 062824**** | MODEL 2 | 47 | 10 | 100. 134. 43. *** |
| 2002/9/4 00:00 | 072824**** | MODEL 3 | 01 | 10 | 10. 134. 43. *** |
| 2002/10/1 00:00 | 082824**** | MODEL 4 | 01 | 10 | 133. 151. 43. *** |
| 2001/10/2 00:00 | 092924**** | MODEL 5 | 01 | 10 | 10. 131. 43. *** |

COMMUNICATION SYSTEM

BACKGROUND OF THE INVENTION

1. Field of the Invention

The present invention relates to a communication system including a terminal device and a center device which are connectable via a communication line, and to the terminal device and the center device.

2. Description of Related Art

Conventionally, there is known a facsimile apparatus that performs printing with a thermal transfer system. The facsimile apparatus of this type uses an ink ribbon wound in a roll shape.

For this facsimile apparatus, a standard ink ribbon, which is applicable to the facsimile apparatus and whose characteristics, such as durability and quality, satisfy a predetermined standard, is manufactured by a manufacturer of facsimile apparatuses or a manufacturer of ink ribbons, and supplied to consumers to ensure that a print operation can be performed satisfactorily.

That is, usually, the facsimile apparatus is constituted so that its product quality is guaranteed assuming that a standard ink ribbon satisfying the above-mentioned standard of characteristics is mounted. Therefore, if a non-standard ink ribbon, which is not determined as the standard ink ribbon and therefore whose characteristic may possibly fail to satisfy the standard is used, a satisfactory print quality will not possibly be attained in the facsimile apparatus and moreover, a print head provided in the facsimile apparatus will possibly be affected adversely, a service life of the ink head will possibly be reduced, or jam of the ink ribbon will possibly occur. In addition, even if a standard ink ribbon whose usable term has expired long time ago is used, even if the ink ribbon is a standard one, the quality characteristics of the ink ribbon possibly changes and causes the above-described deficiencies.

SUMMARY OF THE INVENTION

In view of the above-described drawbacks, it is an is objective of the present invention to provide a communication system which can enable a terminal device, such as a facsimile apparatus, to execute printing operation with a user's desired printing performance, and the terminal device and a center device constituting this communication system.

In order to attain the above and other objects, the present invention provides a communication system, comprising: a terminal device having a printing function and connectable via a communication line to a center device, the terminal device including: a printing unit detachably mounted with a printing component and executing a printing operation using the mounted printing component, the printing component having a storage portion storing information of the printing component; a reading unit that reads the information of the printing component from the storage portion of the printing component mounted in the printing unit; and a transmission unit that transmits the information read by the reading unit to the center device via the communication line to cause the center device to execute judgment operation based on the information, and the center device including: a receiving unit that receives the information sent from the terminal device via the communication line; a judging unit that executes the judgment operation based on the information received by the receiving unit; and a reply unit that returns a result of judgment by the judging unit to the terminal device.

According to another aspect, the present invention provides a center device connectable via a communication line to a terminal device having a printing function, comprising: a receiving unit that receives information of a printing component sent from a terminal device via a communication line; a judging unit that executes judgment operation based on the information received by the receiving unit; and a reply unit that returns a result of judgment by the judging unit to the terminal device.

According to another aspect, the present invention provides a terminal device having a printing function and connectable via a communication line to a center device, the terminal device comprising: a printing unit detachably mounted with a printing component and executing a printing operation using the mounted printing component, the printing component having a storage portion storing information of the printing component; a reading unit that reads the information of the printing component from the storage portion of the printing component mounted in the printing unit; and a transmission unit that transmits the information read by the reading unit to the center device via the communication line to cause the center device to execute judgment operation based on the information.

According to still another aspect, the present invention provides a communication method for attaining communication between a terminal device having a printing function and a center device via a communication line, the method comprising: reading, at the terminal, information of a printing component mounted in the terminal device from a storage portion of the printing component mounted in the printing unit; transmitting the information read by the reading unit to the center device via the communication line; receiving, at the center device, the information sent from the terminal device via the communication line; judging based on the information received by the receiving unit; and returning a result of judgment by the judging unit to the terminal device.

BRIEF DESCRIPTION OF THE DRAWINGS

The above and other objects, features and advantages of the invention will become more apparent from reading the following description of the preferred embodiments taken in connection with the accompanying drawings in which:

FIG. 4A is a plan view showing an external configuration of a ribbon cassette, in which a ribbon set having an ink ribbon is incorporated;

FIG. 4B is a side view of the ribbon cassette of FIG. 4A;

FIG. 10 is a table showing an example of a database for ink ribbons stored in a hard disk device of the call center in the first embodiment;

FIG. 16 is a table showing an example of a database of ink ribbons stored in a hard disk device of the call center in accordance with the second embodiment;

FIG. 17 is a table showing an example of the database of ink ribbons stored in a hard disk device of a call center in accordance with a modification of the second embodiment;

DETAILED DESCRIPTION OF THE PREFERRED EMBODIMENTS

Figure 1:
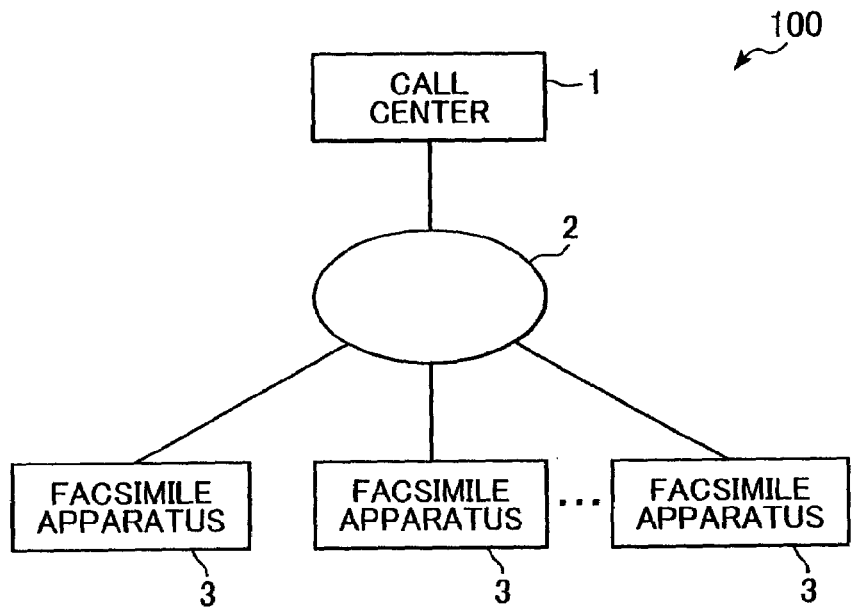
FIG. 1 is a diagram showing a communication system in accordance with a first embodiment of the present invention.

A communication system according to preferred embodiments of the present invention will be described while referring to the accompanying drawings wherein like parts and components are designated by the same reference numerals to avoid duplicating description.

First, a first embodiment will be described with reference to FIGS. 1 to 10.

First Embodiment

Structure of the System

FIG. 1 is a diagram showing a communication system in accordance with a first embodiment of the present invention. This communication system 100 is provided with a call center 1 (center device) and a plurality of facsimile apparatuses 3 (terminal devices). The facsimile apparatuses 3 are connected to the call center 1 via a communication line (public telephone line) 2.

Structure of the Call Center

The call center 1 is an apparatus for communicating with the respective facsimile apparatuses 3 to control the respective facsimile apparatuses 3.

For example, the call center 1 is provided in an office, which deals with complaints and inquiries from users.

The call center 1 can perform bidirectional data communication with the plurality of facsimile apparatuses 3 via the public telephone line 2. That is, the call center 1 receives and recognizes information from the respective facsimile apparatuses 3 and sends various kinds of information to the respective facsimile apparatuses 3.

Figure 2:
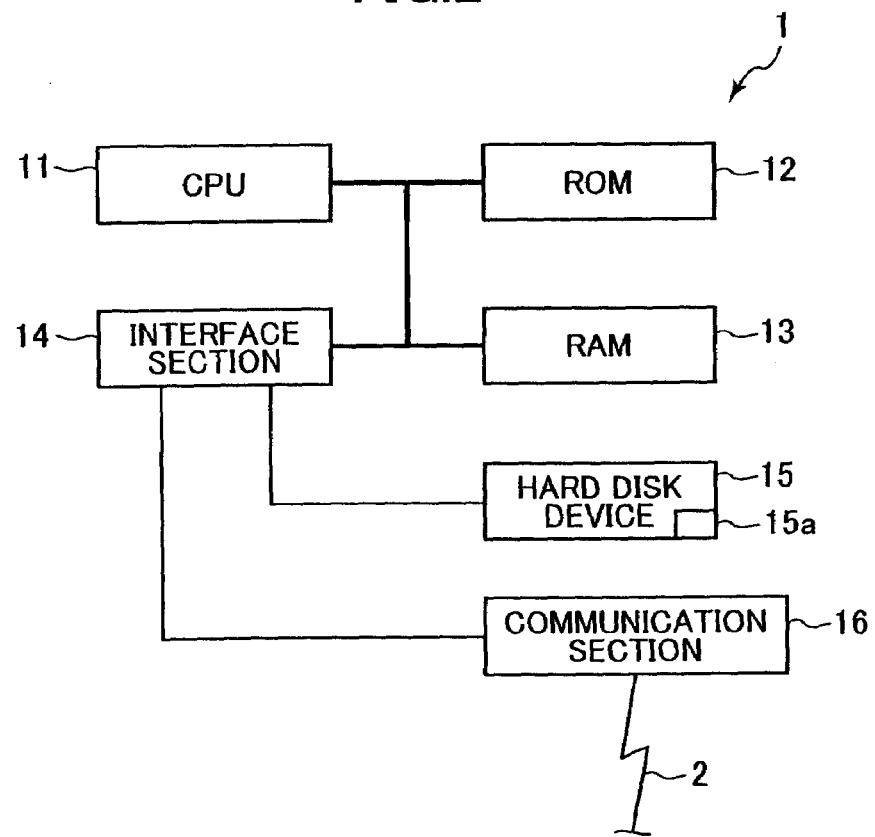
FIG. 2 is a schematic block diagram showing an electric configuration of a call center shown in FIG. 1.

FIG. 2 is a schematic block diagram showing an electric configuration of the call center 1. The call center 1 has a CPU 11, a ROM 12, a RAM 13, and an interface section 14. The CPU 11, the ROM 12, the RAM 13, and the interface section 14 are connected with each other by a bus. The CPU 11 is a control center of the call center 1. The ROM 12 has an execution program shored therein. The RAM 13 is a memory for providing a work area for the CPU 11. A hard disk device 15 and a communication section 16 are connected to the interface section 14. The hard disk device 15 has a ribbon-ID database 15a (FIG. 10) storing a plurality of sets of ribbon-ID (ribbon-Identification) data for a plurality of ink ribbons which will possibly be used in the respective facsimile apparatuses 3. The communication section 16 is constituted by, for example, an NCU, a modem, and the like (not shown) and controls communication with the respective facsimile apparatuses 3.

Structure of the Facsimile Apparatus

The facsimile apparatus 3 is provided with a plurality of functions such as a printing function, an image reading function (scanner function), and an image communication function. In this embodiment, the printing function is of a thermal transfer system. In order to send facsimile data, the facsimile apparatus 3 reads an original using the image reading function and sends the read original data to a destination by using the communication function. When receiving facsimile data by using the communication function, the facsimile apparatus 3 prints contents of the facsimile data on a recording sheet using the printing function. The facsimile apparatus 3 can be utilized as a printer or a scanner independently from a personal computer in a state that the facsimile apparatus 3 is connected to the personal computer or the like. In addition, the facsimile apparatus 3 can also be utilized as a copying machine by operating the printing function and the image reading function in association with each other.

Figure 3:
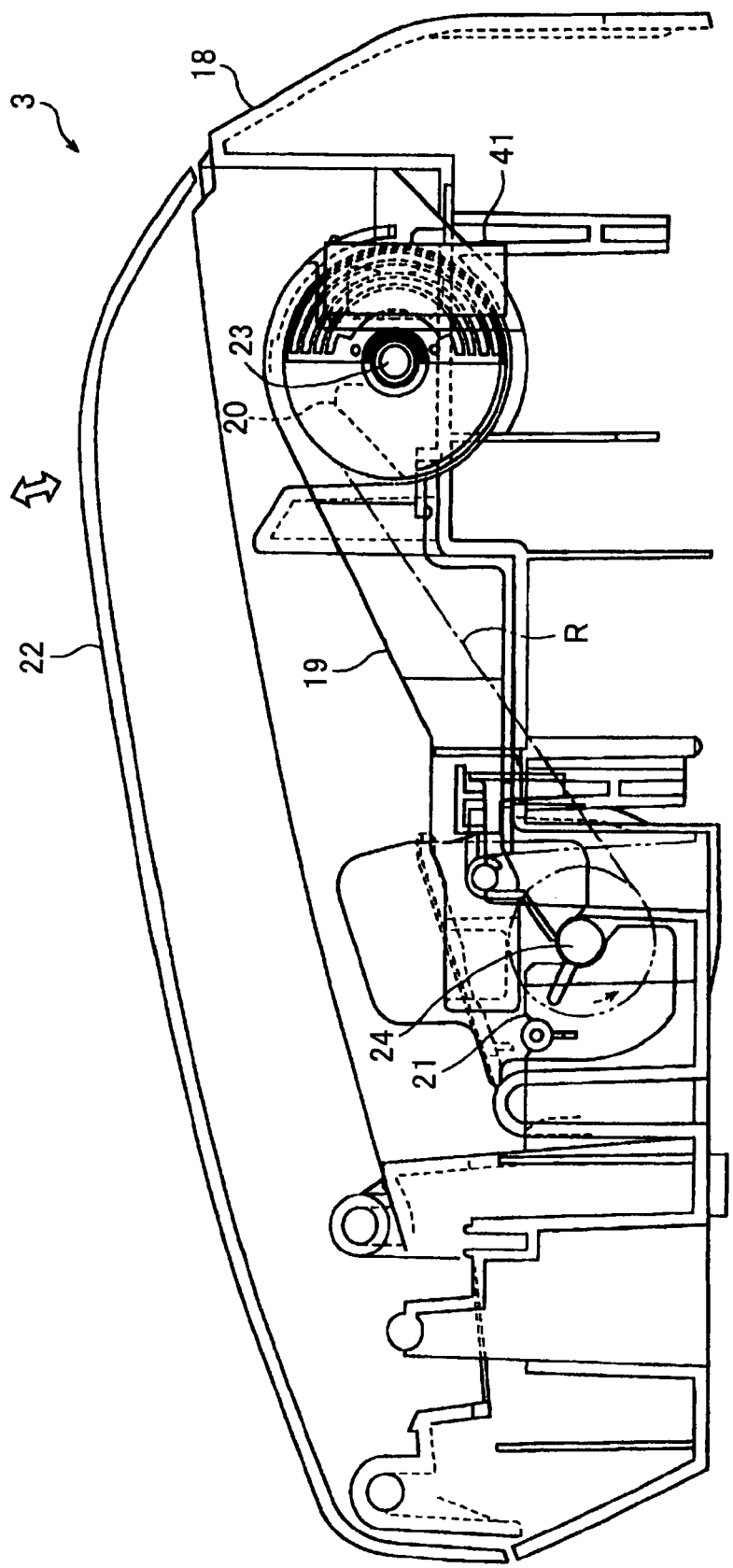
FIG. 3 is a schematic diagram showing the internal structure of a facsimile apparatus shown in FIG. 1.
Figure 6:
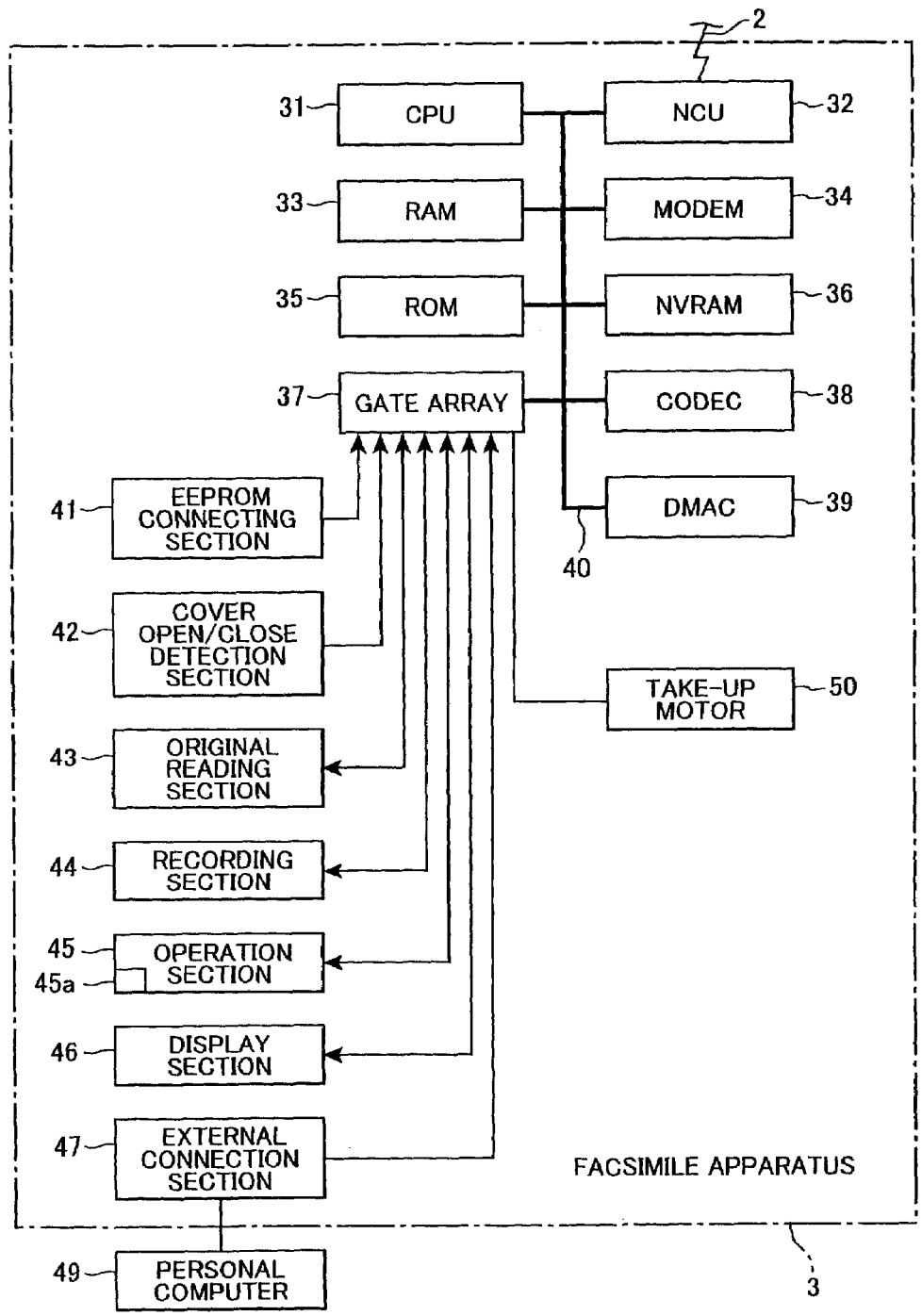
FIG. 6 is a block diagram showing an electric configuration of the facsimile apparatus shown in FIG. 1.

As shown in FIG. 3, this facsimile apparatus 3 has an apparatus main body 18. Bearings 20, 21 are provided in the apparatus main body 18. The bearings 20, 21 are for detachably mounting a ribbon cassette 19 thereon. A main body cover 22 is provided above the apparatus main body 18 so as to be freely opened and closed. The main body cover 22 is a cover for protecting the inside of the apparatus 3. The facsimile apparatus 3 is provided with a cover open/close detection section 42 (FIG. 6). The cover open/close detection section is for detecting open and close of the main body cover 22.

As shown in FIGS. 4A and 4B, an ink ribbon set S is composed of an ink ribbon R, a supply shaft 23, and a winding (take-up) shaft 24. The ink ribbon R is wound around both the shafts 23, 24. The supply shaft 23 is for supplying the ink ribbon R. The winding shaft 24 is for winding or taking up the ink ribbon R around it.

The ink ribbon cartridge 19 has a cartridge frame F, to which the ink ribbon set S is detachably mounted in a manner that the supply shaft 23 and the winding shaft 24 are rotatably supported by the frame F. This construction makes it easy to replace the ink ribbon cartridge 19 mounted to the facsimile apparatus 1 with a new one. When it is desired to replace the ink ribbon R with a new one, a user can perform the replacement not only by purchasing the whole of a new ink ribbon cartridge 19 but also by purchasing only a new ink ribbon set S but reusing the cartridge frame F.

Figure 5:
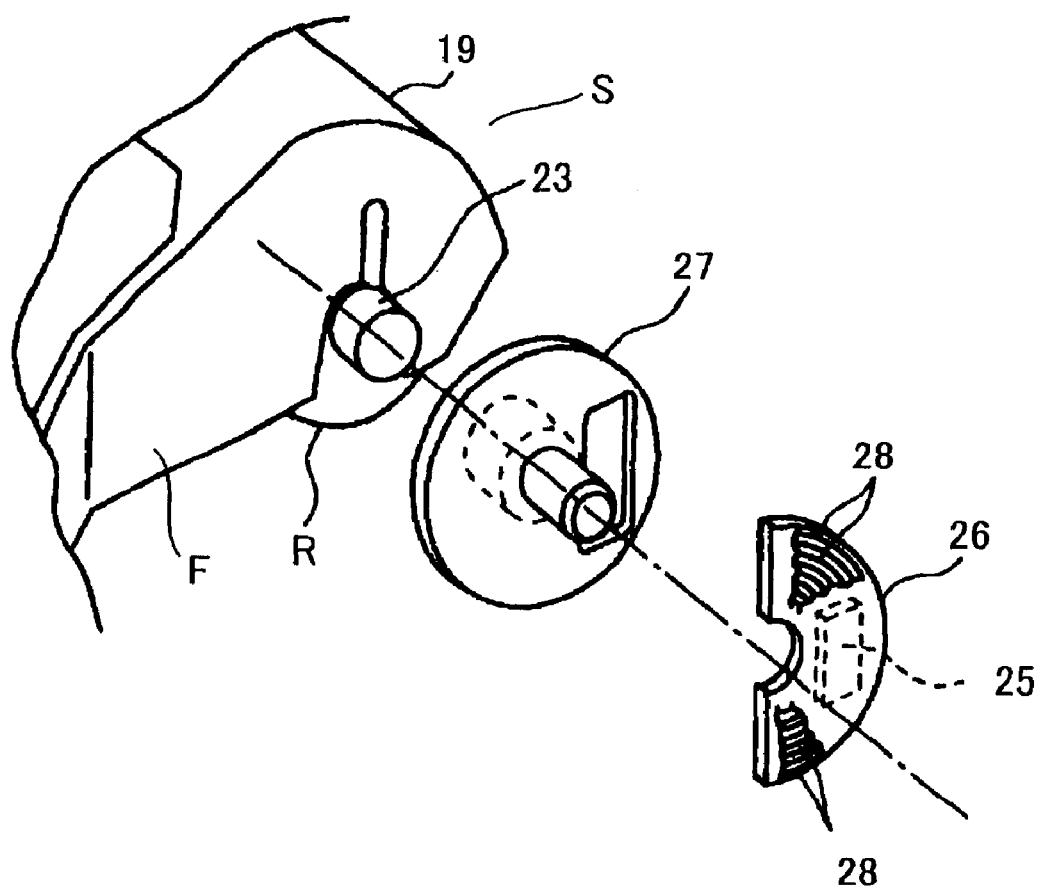
FIG. 5 is an external perspective view showing how a piece of substrate, on which an EEPROM is provided, is being mounted onto a ribbon set.

As shown in FIG. 5, a spool 27 is fitted to one end of the supply shaft 23. A piece of substrate 26 is attached to the spool 27. As shown in FIG. 5, an EEPROM 25 is provided on the back side of the piece of substrate 26.

When the ribbon cassette 19 is mounted in the facsimile apparatus main body 18, the other end of the supply shaft 23, which is opposite to the end of the supply shaft 23 where the spool 27 is fitted, is coupled to a tension motor (not shown), and one end of the winding shaft 24 is coupled to the take-up motor 50 (FIG. 6). The tension motor is for giving a tension to the ink ribbon R. The winding motor 50 is for driving to rotate the winding shaft 24 to take up the ink ribbon R around the shaft 24. The take-up motor 50 is, for example, a stepping motor, and is driven to rotate according to pulse signals supplied from a CPU 31.

The EEPROM 25 is a memory storing a set of ribbon-ID (ribbon-Identification) data of the ink ribbon R. It is noted that a manufacturer of the ink ribbon R determines a set of ribbon-ID data for the ink ribbon R before shipping the ribbon R from the manufacturer. The ribbon-ID data is for identifying the subject ink ribbon R. The ribbon-ID data is composed of numerals of several digits or a string of characters. In this example, the ribbon-ID data is eight to ten bits of data indicative of a manufacture-lot number and a serial number specifying the subject ink ribbon R.

As shown in FIG. 5, a plurality of conductor patterns 28 are formed on a surface on the front side of the piece of substrate 26, which is opposite to the back side, on which the EEPROM 25 is provided. The plurality of conductor patterns 28 are electrically connected with a plurality of terminals (not shown) of the EEPROM 25. The respective conductor patterns 28 are formed substantially in shapes of concentric semicircles and formed in the order of a power supply line, a control signal line, and a data signal line from an outer edge to an inside of the piece of substrate 26.

As shown in FIG. 3, an EEPROM connecting section 41 is provided on the apparatus main body 18 side of the facsimile apparatus 3 at a position that confronts the front side of the piece of substrate 26 when the ribbon cassette 19 is mounted in the apparatus main body 18. This EEPROM connecting section 41 has a plurality of contact-point terminals (not shown), each of which is for contacting with a corresponding conductor pattern 28 on the substrate 26. The contact-point terminals will come into contact with the respective conductor patterns 28 when the ribbon cassette 19 is mounted in the apparatus main body 18.

Electric Configuration of the Facsimile Apparatus

As shown in FIG. 6, the facsimile apparatus 3 is provided with the CPU 31, an NCU 32, a RAM 33, a modem 34, a ROM 35, an NVRAM (nonvolatile RAM) 36, a gate array 37, a codec 38, and a DMAC 39, which are connected with one another by a bus 40. The bus 40 has an address bus, a data bus, and a control signal line. The EEPROM connecting section 41, the cover open/close detection section 42, the take-up motor 50, an original reading section 43, a recording section 44, an operation section 45, a display section 46, and an external connection section 47 are connected to the gate array 37. The public telephone line 2 is connected to the NCU 32, and a personal computer 49 is connected to the external connection section 47.

The CPU 31 controls operations of the entire facsimile apparatus 3.

The NCU 32 performs network control by being connected to the public telephone line 2. Facsimile data, ribbon-ID data, and the like can be received or sent by this network control.

The RAM 33 provides a work area or the like for the CPU 31.

The modem 34 performs modulation, demodulation, and the like of facsimile data, manufacturer-ID (manufacturer-Identification) data of the facsimile apparatus 3, and ribbon-ID data of the presently-mounted ink ribbon R.

The ROM 35 prestores therein various programs (such as programs of FIGS. 7 and 8) to be executed by the CPU 31.

The NVRAM 36 stores data and various kinds of information.

The gate array 37 functions as an interface between the CPU 31 and the respective sections 41 to 47, and 50. The codec 38 performs coding and decoding of facsimile data and the like. The DMAC 39 writes data in and reads it out from the RAM 33.

The EEPROM connecting section 41 is for reading the ribbon-ID from the EEPROM 25, which is attached to the ribbon set S. The EEPROM connecting section 41 can perform its reading operation because its contact-point terminals are connected to the conductor patterns 28 of the piece of substrate 26, on which the EEPROM 25 is provided. The CPU 31 can read data out from the EEPROM 25 and write data in the EEPROM 25 via the EEPROM connecting section 41.

The cover open/close detection section 42 is for detecting open and close of the main body cover 22. The cover open/close detection section 42 executes its detection mechanically, optically, electrically, or magnetically. The cover open/close detection section 42 transmits open/close signals indicative of the open/close state of the main body cover 22 to the CPU 31. The cover 22 is opened when the ribbon cassette 19 is detached from the apparatus 3 or when the ribbon cassette 19 is mounted into the apparatus 3.

The original reading section 43 is provided with, for example, an image sensor, an LED light source, and an original feed motor (all of which are not shown) and reads an image from a facsimile original or the like according to control of the CPU 31.

The recording section 44 prints an image such as characters or figures in monochrome or color by using the thermal system or the like.

The operation section 45 is provided with ten keys and various operation keys and transmits to the CPU 31 an input signal issued in response to a key operation of a user or a operator (maintenance-service operator).

The operation section 45 has a power switch 45a. When a user turns on the power switch 45a, the power of the apparatus 3 is turned on.

The display section 46 is provided with, for example, a liquid crystal display, and displays an operating state, an operation guidance, and the like.

When this facsimile apparatus 3 is used as peripheral equipment, the external connection section 47 is connected to a personal computer 49, and exchanges data with the personal computer 49.

It is noted that many ink ribbon sets S, which are mounted with standard ink ribbons R and which are mountable in the ribbon cassette 19, are manufactured by a manufacturer of the facsimile apparatus 3 and by manufacturers of ink ribbons. The standard ink ribbons R are determined and confirmed by the facsimile-manufacturer as such ink ribbons whose characteristics, such as durability and quality, satisfy a predetermined standard required to attain a satisfactory print operation. Many other ink ribbon sets S, which are mounted with non-standard ink ribbons R but which are mountable in the ribbon cassette 19, are manufactured by other ribbon-manufacturers. The non-standard ink ribbons R are not confirmed by the facsimile-manufacturer, and therefore it is unknown whether the characteristics of the non-standard ink ribbons R satisfy the predetermined standard. The characteristics of the non-standard ink ribbons may possibly fail to satisfy the predetermined standard. When the non-standard ink ribbons are mounted in the facsimile apparatus 3, therefore, the facsimile apparatus 3 may possibly fail to attain the satisfactory printing operation.

According to the present embodiment, the EEPROM 25 mounted on the supply shaft 23 of the ink ribbon set S stores therein not only the ribbon-ID data of the ink ribbon R but also a flag indicating whether the ink ribbon R is valid, invalid, or not-yet determined. At the beginning of shipment of the ink ribbon set S, "not-yet determined" is set as the flag. The "flag" will be rewritten into "valid" or "invalid" when the facsimile apparatus 3, mounted with the ink ribbon set S, receives a result of judgment of the validity, of the ink ribbon R from the call center 1.

In the apparatus side, the NVRAM 36 also stores therein a flag indicating whether a presently-mounted ink ribbon R is valid or invalid.

The NVRAM 36 is prestored with: data of a telephone number of the call center 1; and manufacturer-ID data of manufacturer of the facsimile apparatus 3. The call-center telephone-number data and the manufacturer-ID data are stored in the NVRAM 36 before the facsimile apparatus 3 is shipped out from its manufacturer. The manufacturer-ID data indicates an ID number specifying the manufacturer of the facsimile apparatus 3.

An ink ribbon counter (not-shown) is provided in the RAM 33. The ink ribbon counter is for counting the amount of ink ribbon R that has been used. The NVRAM 36 stores the value of the ribbon counter indicative of the present ink-ribbon used amount. When the ink ribbon counter detects that the used amount of the ink ribbon R has exceeded a predetermined value and therefore the ink-ribbon counter value stored in the NVRAM 36 exceeds the predetermined value, the CPU 31 automatically determines that the ink ribbon R has run out and resets both of the flags in the NVRAM 36 and the EEPROM 25 from "valid" to "invalids".

According to the present embodiment, when the power switch 45a of the facsimile apparatus 3 is turned on, the facsimile apparatus 3 reads out ribbon-ID data from the EEPROM 25 in the presently-mounted ink ribbon cassette 19 and transmits the ribbon-ID data to the call center 1. In the call center 1, the CPU 11 receives the ribbon-ID data from the facsimile apparatus 3, judges whether the ribbon-ID data is valid or invalid, and returns a result of the judgment to the facsimile apparatus 3. Consequently, the facsimile apparatus 3 can grasp whether the presently-mounted ink ribbon R is a standard ink ribbon or a non-standard ink ribbon.

Operations of this facsimile apparatus 3 will be hereinafter described in detail.

Figure 7:
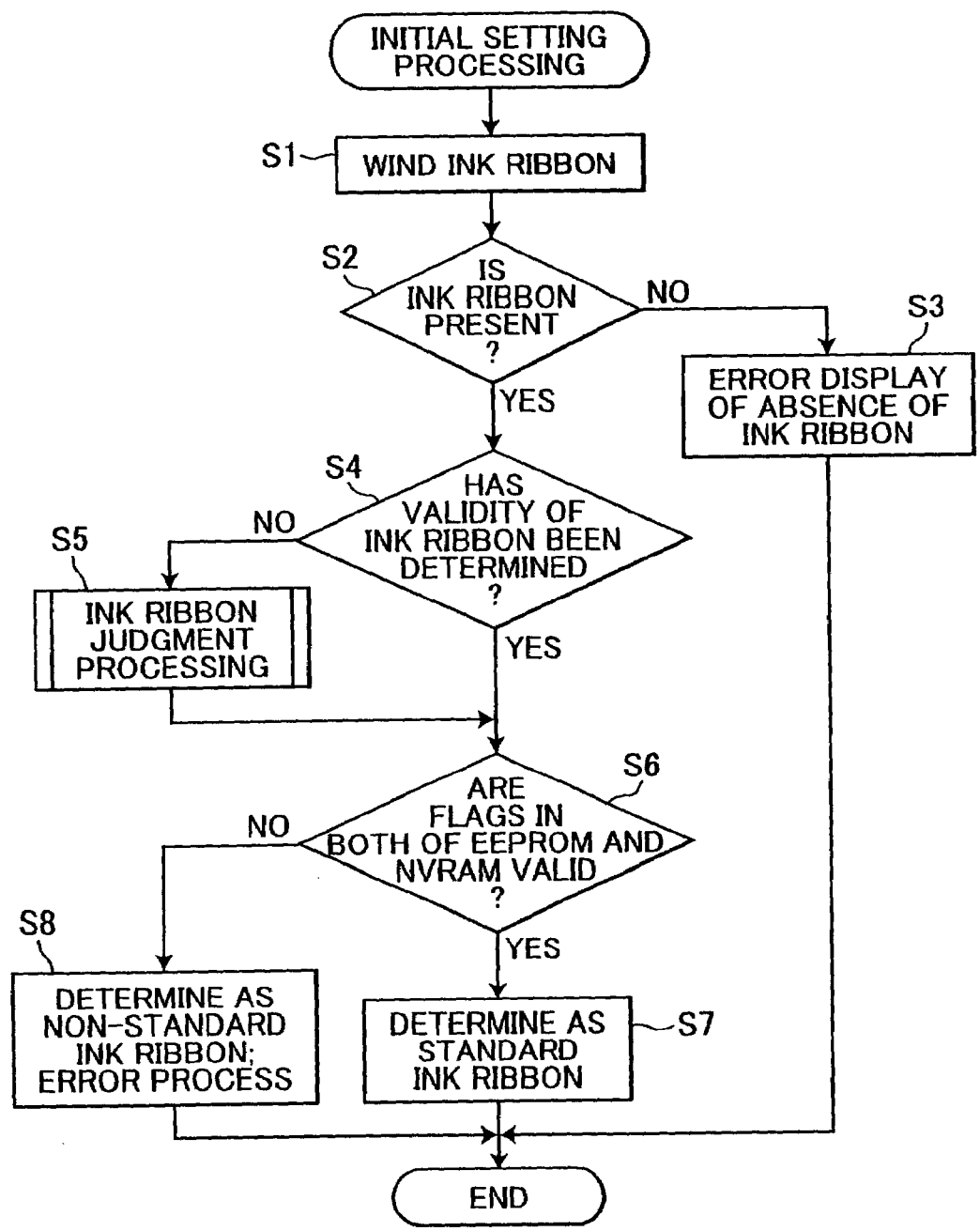
FIG. 7 is a flowchart showing initial setting processing executed by a CPU of the facsimile apparatus according to the first embodiment.

The CPU 31 of the facsimile apparatus 3 performs initial setting processing shown in FIG. 7 when the power switch 45a is turned on.

During the initial setting processing, first, the CPU 31 performs winding processing (S1). In the winding processing, the supply shaft 23 of the ribbon cassette 19 is driven to rotate by the tension motor (not shown) to maintain the ink ribbon as being properly taut and a constant tension is applied to the ink ribbon R. In this winding processing, the CPU 31 simultaneously judges presence or absence of an ink ribbon R (S2) If an ink ribbon R is not mounted (S2: NO), it is known that it is impossible to recognize ribbon-ID data from the EEPROM 25, and therefore the CPU 31 displays an error message, on the display section 46, to inform a user that an ink ribbon R is absent (S3).

If it is determined that the ink ribbon is mounted (S2: YES), the CPU 31 judges whether or not validity ("valid" or "invalid") of the presently-mounted ink ribbon R has been determined (S4). That is, in S4, the CPU 31 judges whether or not the flag in the EEPROM 25 has been determined into "valid" or "invalid". For example, when a new ink ribbon R (new ink ribbon set S) is mounted in the apparatus 3, the flag in the EEPROM 25 of the new ink ribbon set S is, in the "not-yet determined" state. Therefore, it is unknown whether or not the ink ribbon is a standard ink ribbon. Thus, the CPU 31 determines that the validity of the presently-mounted ink ribbon R has not yet been determined (S4: NO). Accordingly, the CPU 31 performs ink-ribbon judgment processing in S5. During the ink-ribbon judgment processing of S5, the CPU 31 determines whether the presently-mounted ink ribbon is valid or invalid and sets the flags in the EEPROM 25 and the NVRAM 36 into "valid" or "invalid" based on the judgment result.

On the other hand, if the validity of the presently-mounted ink ribbon R has been determined (S4: yes) or when the validity is determined in the ink-ribbon judgment processing of 5, the CPU 31 judges in S6 whether or not the flags in the EEPROM 25 and the NVRAM 36 are both "valid".

If the flags in both of the EEPROM 25 and the NVRAM 36 are "valid" (S6: YES), the CPU 31 recognizes that the presently-mounted ink ribbon R is a standard ink ribbon (S7) and ends the initial setting processing. Thereafter, when a print instruction is issued from the personal computer 49, printing will be started.

On the other hand, if the flag in the EEPROM 25 or the flag in the NVRAM 36 is "invalid" (S6: NO), the CPU 31 recognizes that the presently-mounted ink ribbon R is a non-standard ink ribbon, and executes an error processing (S8).

In this error processing of S5, the CPU 31 displays an error message "Ink ribbon is not a standard ink ribbon." On the display section 46. Alternatively, the CPU 31 may print this error message on a recording sheet. As a result, a user can learn that the presently-mounted ink ribbon R is not a standard ink ribbon.

After executing the error processing of S8, the CPU 31 ends the initial setting processing. Thereafter, when a print instruction is issued, printing will be started.

It is noted that the user can recognize that the presently-mounted ink ribbon is a non-standard ink ribbon by the error processing (S8). Accordingly, the user can decide to replace the ink ribbon with another standard ink ribbon. It is noted, however, that the user may continue using the presently-mounted non-standard ink ribbon.

After the error processing is executed in S8 and the initial setting process ends, when a print instruction is issued, the same error processing as the error processing of S8 may be executed again to inform the user that the presently-mounted ink ribbon R is a non-standard ink ribbon. After executing such an error processing, printing is started.

It is noted that the error processing of S8 may be modified to not only display or print the message, but also to disable the printing function of the facsimile apparatus 3. In such a case, even if a print instruction is issued, printing will not be executed. It is preferable to employ this modification when a significant problem in terms of quality is expected to occur by the presently-mounted non-standard ink ribbon R.

Figure 8:
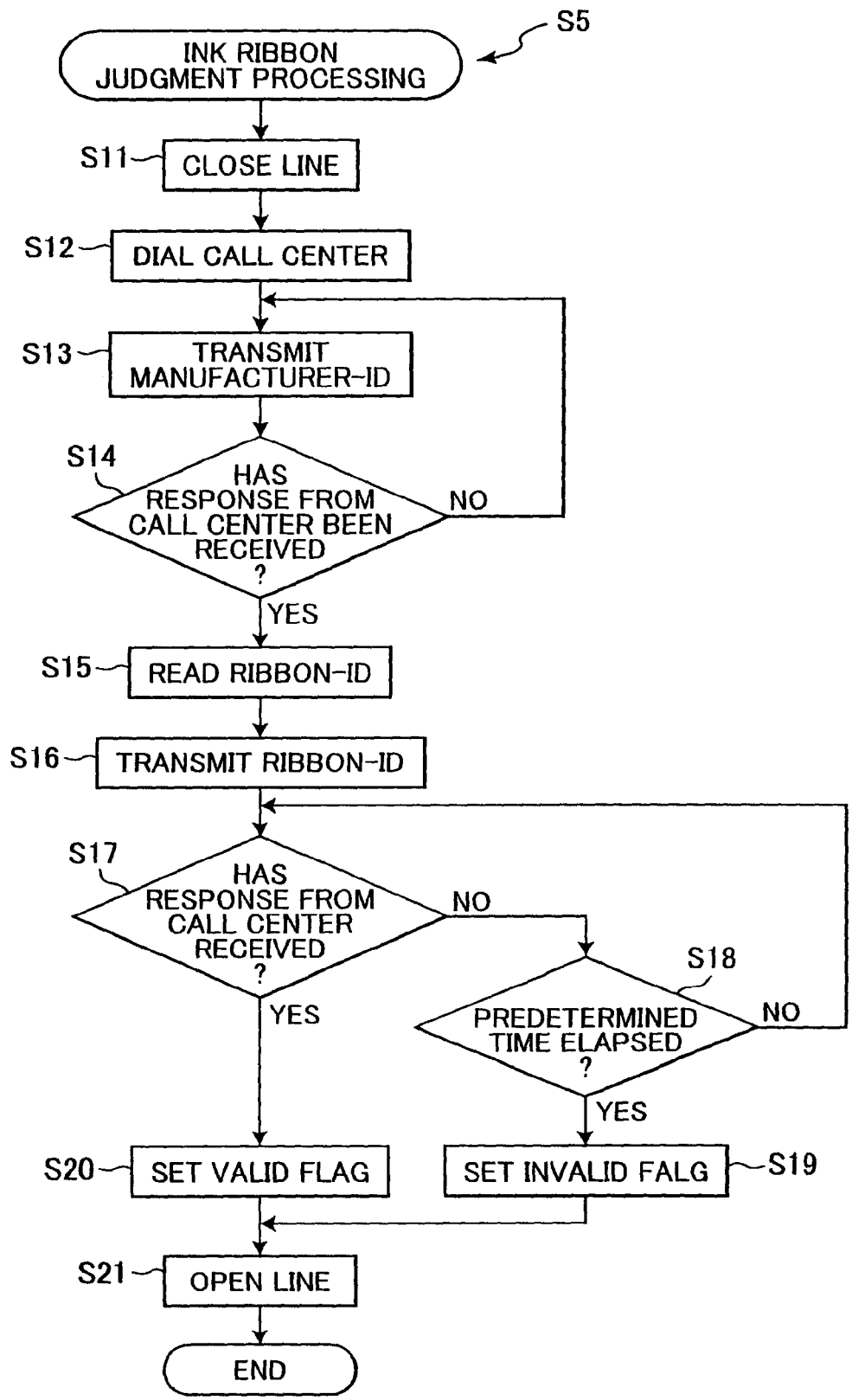
FIG. 8 is a flowchart showing ink ribbon judgment processing during the initial setting processing of FIG. 7.
Figure 9:
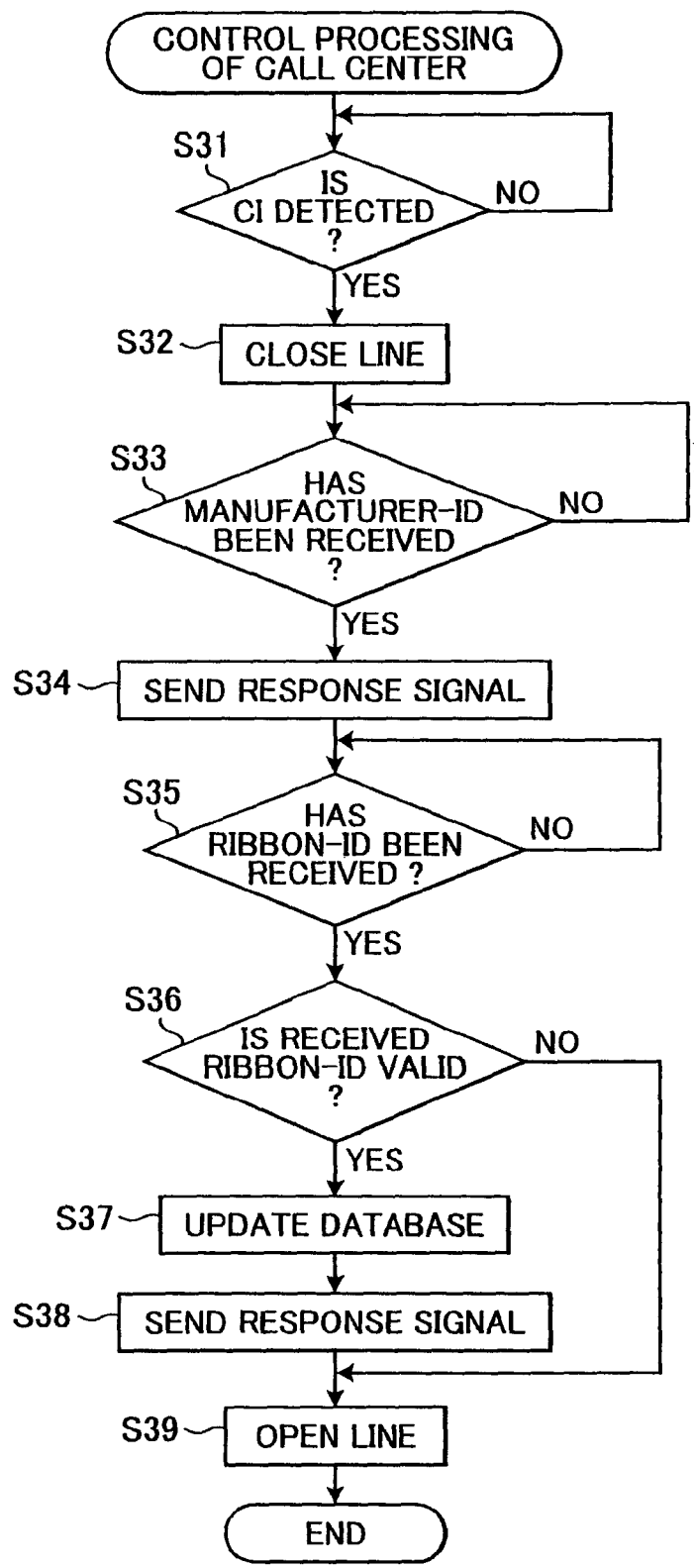
FIG. 9 is a flowchart showing a control process executed by a CPU of a call center in the first embodiment.

Next, the ink ribbon judgment processing (S5) will be described in greater detail with reference to a flowchart shown in FIG. 8. It is noted that the call center 1 performs control processing as shown in FIG. 9 when the facsimile apparatus 3 executes the ink ribbon judgment processing.

During the ink ribbon judgment processing of S5, the CPU 31 first sends to the NCU 32 a signal to request the NCU 32 to close the public telephone line 2 (S11). After closing the line, the CPU 31 reads the telephone number of the call center 1 from the NVRAM 36 and dials the call center 1 (S12).

Subsequently, the CPU 31 reads the manufacturer-ID data from the NVRAM 36, converts the manufacturer-ID data into a DTMF (Dual-tone multiple-frequency) tone signal, and transmits the DTMF signal to the public telephone line 2 (S13). By transmitting the manufacturer-ID data to the center 1, it is possible to prevent a so-called hacker from intruding into the database 15a of the call center 1 to break contents of the database.

Subsequently, the CPU 31 judges whether or not the facsimile apparatus 3 has received a first response DTMF signal, which is returned to the facsimile apparatus 3 as a response from the call center 1 (S14). When this DTMF signal has not yet been received (S14: NO), the program returns to the manufacturer-ID transmission processing of S13.

On the other hand, when the first response DTMF signal is received (S14: YES), the CPU 31 reads the ribbon-ID data from the EEPROM 25 via the EEPROM connection section 41 (S15). The CPU 31 converts the ribbon-ID data into still another DTMF signal, and transmits the DTMF signal to the public telephone line 2 (S16).

Subsequently, the CPU 31 judges whether or not the facsimile apparatus 3 has received a second response DTMF signal from the call center 1. The second response DTMF signal indicates that the DTMF signal (ribbon-ID data) transmitted to the call center 1 in S16 has been received by the call center 1 (S17).

If the second response DTMF signal has not yet been received (S17: NO), the CPU 31 judges whether or not a predetermined time has elapsed (S18). When the predetermined time has not yet been elapsed (S18: NO), the program returns to the judgment processing of S17.

On the other hand, when the predetermined time has elapsed (S18: YES), it is known that the predetermined time has elapsed but no response DTMF signal has been received. Accordingly, the CPU 31 recognizes that the ribbon-ID data is invalid, and sets invalid flags in both of the EEPROM 25 and the NVRAM 36 (S19). After setting the invalid flags in S19, the CPU 31 opens the closed telephone line (S21).

On the other hand, if a response DTMF signal has been received (yes in S17), the CPU 31 recognizes that the ribbon-ID data is valid, and sets valid flags in both of the EEPROM 25 and the NVRAM 36 (S20). After setting the valid flags in S20, the CPU 31 opens the closed telephone line (S21).

While the facsimile apparatus 3 executes the ink ribbon judging process as described above, the call center 1 executes control process as shown in FIG. 9.

In the call center 1 side, the CPU 11 judges whether or not a CI (Calling Indicator) signal has been detected (S31). When a CI signal is detected (S31: YES), the CPU 11 closes the telephone line 2 (S32), and judges whether or not a DTMF signal indicative of the manufacturer-ID has been received from the facsimile apparatus 3 (S33).

When the DTMF signal is received (S33: YES), the CPU 11 transmits, to the facsimile device 3, a DTMF signal as a response to the manufacturer-ID (S34).

Subsequently, the CPU 11 judges whether or not a DTMF signal of the ribbon-ID data has been received from the facsimile apparatus 3 (S35).

If a DTMF signal of the ribbon-ID is received (S35: YES), the CPU 11 judges whether or not the ribbon-ID data of the received DTMF signal is valid (S36).

It is noted that the hard disk device 15 in the central device 1 stores the ribbon-ID database 15a as shown in FIG. 10. As apparent from FIG. 10, the database 15a is previously registered with a plurality of sets of different ribbon-ID data for a plurality of different ink ribbons. The database 15a further stores, for each ribbon-ID, an invalid flag indicating that the corresponding ribbon-ID is valid or invalid. The invalid flag of "0" indicates that the ribbon-ID is valid. The invalid flag of "1" indicates that the ribbon-ID is invalid.

In S36, therefore, the CPU 11 compares the one set of ribbon-ID data received from the facsimile apparatus 3 with the plurality of sets of ribbon-ID data in the database 15a. If the received ribbon-ID data set is included in the plurality of sets of ribbon-ID data in the database 15a, the CPU 11 further judges whether or not the received ribbon-ID data is valid by referring to the invalid flag for the subject ribbon-ID data.

For example, according to FIG. 10, if the received ribbon-ID is "100012345", the corresponding invalid flag is "0". Accordingly, the CPU 11 determines that the received ribbon-ID is valid.

If the received ribbon-ID is "100012346", the corresponding invalid flag is "1". Accordingly, the CPU 11 determines that the received ribbon-ID is invalid.

In this way, if ribbon-ID data the same as the received ribbon-ID data exists in the database 15a and if the invalid flag of the subject ribbon-ID data is "0", the CPU 11 determines that the received ribbon-ID data is valid (S36: YES). In such a case, the CPU 11 updates the contents of the database 15a (S37). More specifically, the CPU 11 changes the invalid flag for the present ribbon-ID from "0" into "1", in order to that the CPU 11 will determine the present ribbon-ID as invalid when the ribbon-ID is received again thereafter. Accordingly, although the call center 1 determines some ribbon-ID as valid at some time, when the facsimile apparatus 3 accesses the call center 1 again by transmitting the same ribbon-ID, the call center 1 will determine the same ribbon-ID as invalid at that time. Accordingly, the call center 1 can determine even a standard ink ribbon as invalid if a usable period of time for the standard ink ribbon has expired.

After updating the database 15a, the CPU 11 converts, into a DTMF signal, a response signal informing that the received ribbon-ID is valid, and sends the DTMF signal to the facsimile apparatus 3 (S38).

It is noted that the telephone line 2, which has been closed when the facsimile apparatus 3 has dialed the call center 1 in S12 (FIG. 8), is maintained as being closed. Accordingly, it is ensured that this response DTMF signal can be sent to the facsimile device 3 through this closed telephone line.

Thereafter, the CPU 11 opens the telephone line 2 (S39).

On the other hand, if the CPU 11 determines that the received ribbon-ID data is invalid (S36: NO), the CPU 11 opens the telephone line 2 (S39) without sending to the facsimile apparatus 3 any response signal informing that the ribbon-ID data is invalid.

It is noted that if the received ribbon-ID data is not included in the database 15a (no in S36), the CPU 11 newly registers the received ribbon-ID data in the database 15a. At the same time, the CPU 11 sets the invalid flag "1" to the newly-added ribbon-ID data. In this way, the CPU 11 determines that the newly-received ribbon-ID is invalid. According to this control operation, the call center 1 can collect information of ribbon-IDs used in many non-standard ink ribbons. By supplying this information to the manufacturer of standard ink ribbons, it is possible to prevent the manufacturer from redundantly giving ribbon-IDs for non-standard ink ribbons onto newly-manufactured standard ink ribbons. It is noted that instead of setting the invalid flag for the newly-added ribbon-ID to "1", the CPU 11 may turn ON another type of flag in correspondence with the newly-registered ribbon-ID.

In the above description, the CPU 11 does not respond to the facsimile apparatus 3 if the CPU 11 determines that the received ribbon-ID data is invalid. The facsimile device 3 determines that the presently-mounted ink ribbon is invalid when the predetermined time has elapsed without receiving any response signal from the call center 1. However, the call center 1 can return to the facsimile device 3 a response DTMF signal informing that the received ribbon-ID is invalid. In such a case, the facsimile apparatus 3 will know that the presently-mounted ink ribbon is a non-standard one when receiving such a DTMF response signal.

In the above description, the telephone line that has been closed when the facsimile apparatus 3 has dialed the call center 1 in S12 is maintained as being closed until the call center 1 returns a response to the facsimile device 3 in S38. However, the facsimile device 3 may send in S16 not only the ribbon-ID data but also data of the telephone number of the terminal device 3 to the center 1. In such a case, after executing S16, the facsimile apparatus 3 opens the telephone line 2. In S38, the center 1 calls back the facsimile apparatus 3 by dialing the telephone number of the facsimile apparatus 3 to inform the result of judgment by the center 1.

As described above, in the communication system 100 of the present embodiment, the call center 1 is connectable via the communication line 2 to the facsimile apparatus 3 having a printing function. The facsimile apparatus 3 reads ribbon-ID data of an ink ribbon R mounted therein, and sends the read ribbon-ID data to the center device 1. The call center 1 receives the ribbon-ID data from the facsimile apparatus 3, judges whether or not the ribbon-ID data is valid, and returns a result of the judgment to the facsimile apparatus 3.

In this way, according to the communication system 100, the facsimile device 3 reads the ribbon-ID data of the presently-mounted ink ribbon and sends the ribbon-ID data to the center device 1. The center device 1 judges whether or not the received ribbon-ID data is valid, that is, whether or not the ink ribbon for the received ribbon-ID data is a standard ink ribbon. Then, the center 1 returns a result of the judgment to the facsimile apparatus 3. Therefore, it is ensured that the facsimile apparatus 3 can grasp whether or not the presently-mounted ink ribbon R is a standard ink ribbon. By executing the error processing when it is determined that the presently-mounted ink ribbon R is a non-standard ink ribbon, the facsimile apparatus 3 can inform a user the fact that the presently-mounted ink ribbon is a non-standard ink ribbon. The user can easily grasp whether or not the ink ribbon which the user intends to use is a standard ink ribbon. Even if the user mounts an ink ribbon set S having a non-standard ink ribbon R without knowing this fact, the user can know that fact and decide whether to change the ink ribbon set S with another ink ribbon set with a standard ink ribbon R or to continue using the present non-standard ink ribbon R.

According to this embodiment, when the facsimile apparatus 3 receives a result of judgment from the center device 1, the facsimile device 3 writes the received result of judgment both in the EEPROM 25 of the ink ribbon set S and in the NVRAM 36 of the facsimile apparatus 3. Then, based on the judged result, the facsimile device 3 controls the display 46 to display the message. The facsimile device 3 may disable the printing function based upon the result of judgment.

In the above-description, the center 1 judges whether or not the presently-mounted ink ribbon R is a standard ink ribbon. However, it is conceivable to modify the facsimile apparatus 3 to execute such a judgment. However, in such a modification, each facsimile apparatus has to be provided with a database 15a storing an enormous set of ribbon-ID data. This will increase the producing costs of the facsimile apparatus 3. Contrarily, according to the present embodiment, the database 15a is provided in the call center 1 only. Accordingly, it is possible to prevent increase in producing costs in each facsimile apparatus 3. Additionally, by commonly using the single database 15a by many facsimile devices 3, it is possible to realize reduction of costs in the entire system 100.

According to the present embodiment, the facsimile apparatus 3 stores data of the telephone number of the center device 1 in advance, and performs transmission to the center 1 by dialing the telephone number of the center 1. Therefore, it is ensured that the ribbon-ID data can be sent to the center 1.

The center 1 sends to the facsimile device 3 a response through the telephone line 2 which has been closed by the facsimile apparatus 3. Therefore, it is ensured that a result of judgment can be returned to the facsimile device 3.

First Modification

Figure 11:
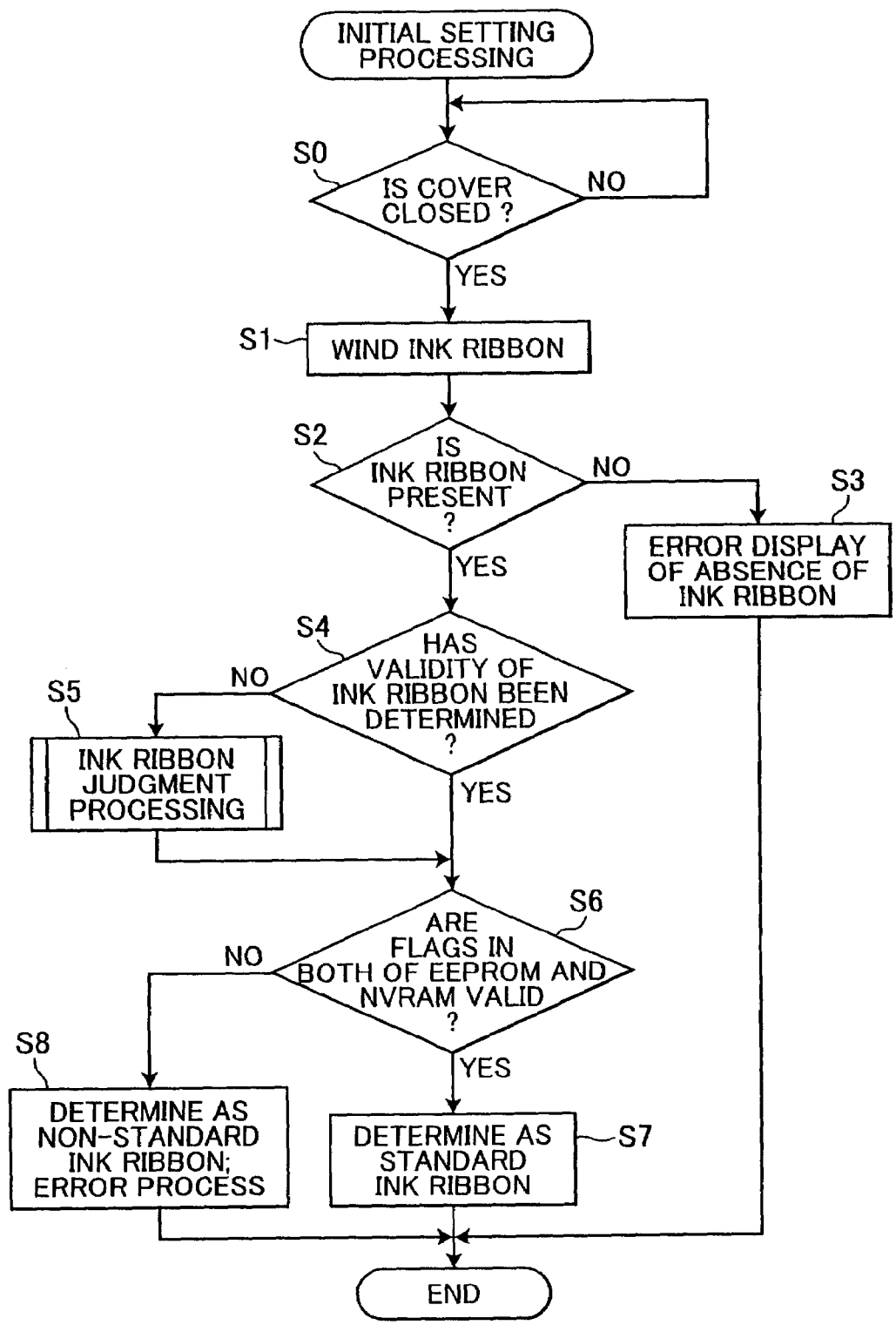
FIG. 11 is a flowchart showing initial setting processing in accordance with a first modification of the first embodiment.

In the above description, the initial setting processing of FIG. 7 is executed when the power switch 45a is turned on. However, the initial setting processing may be executed when the main body cover 22 is closed from its opened state as shown in FIG. 11. More specifcially, the CPU 31 judges whether or not the main body cover 22 is closed from its opened state (S0). When the CPU 31 determines that the main body cover 22 is closed from its opened state based upon a detection output signal supplied from the cover open/close detection section 42 (S0: YES), the CPU 31 performs processing of steps S1 to S8 in the same manner as in the above-described embodiment of FIG. 7.

In this way, according to the above-described embodiment and the first modification, the ribbon-ID data of the presently-mounted ink ribbon R is judged when the power of the facsimile device 3 is turned ON or when the main body cover 22 is closed. In other words, the ribbon-ID data is judged always before the ink ribbon R is used for printing. Accordingly, the user can know whether or not the presently-mounted ink ribbon R is a standard ink ribbon, before using the ink ribbon R for printing. The user can attain his/her desired printing performance.

Second Modification

In the above description, the call-center telephone-number data is stored in the NVRAM 36 on the apparatus 3 side. However, the call-center telephone-number data may be stored in the EEPROM 25 of the ribbon set S side. Even if the telephone number of the call center 1 is changed, it is possible to easily store the new telephone number data in the EEPROM 25 of a newly-manufactured ribbon set S.

According to this modification, when a plurality of different call centers 1 are provided, a plurality of different kinds of ribbon sets S may be stored with telephone-number data for the plurality of different call centers 1, respectively. The plurality of different kinds of ribbon sets S may be managed by the plurality of different call centers 1, respectively.

Second Embodiment

Next, a communication system 100 in accordance with a second embodiment will be described with reference to FIGS. 12-17.

In this embodiment, the Internet 5 is provided as a network connecting between the call center 1 and the facsimile apparatus 3. The ribbon-ID data and the judgment result by the call center 1 are communicated as being included in electronic mails.

Figure 12:
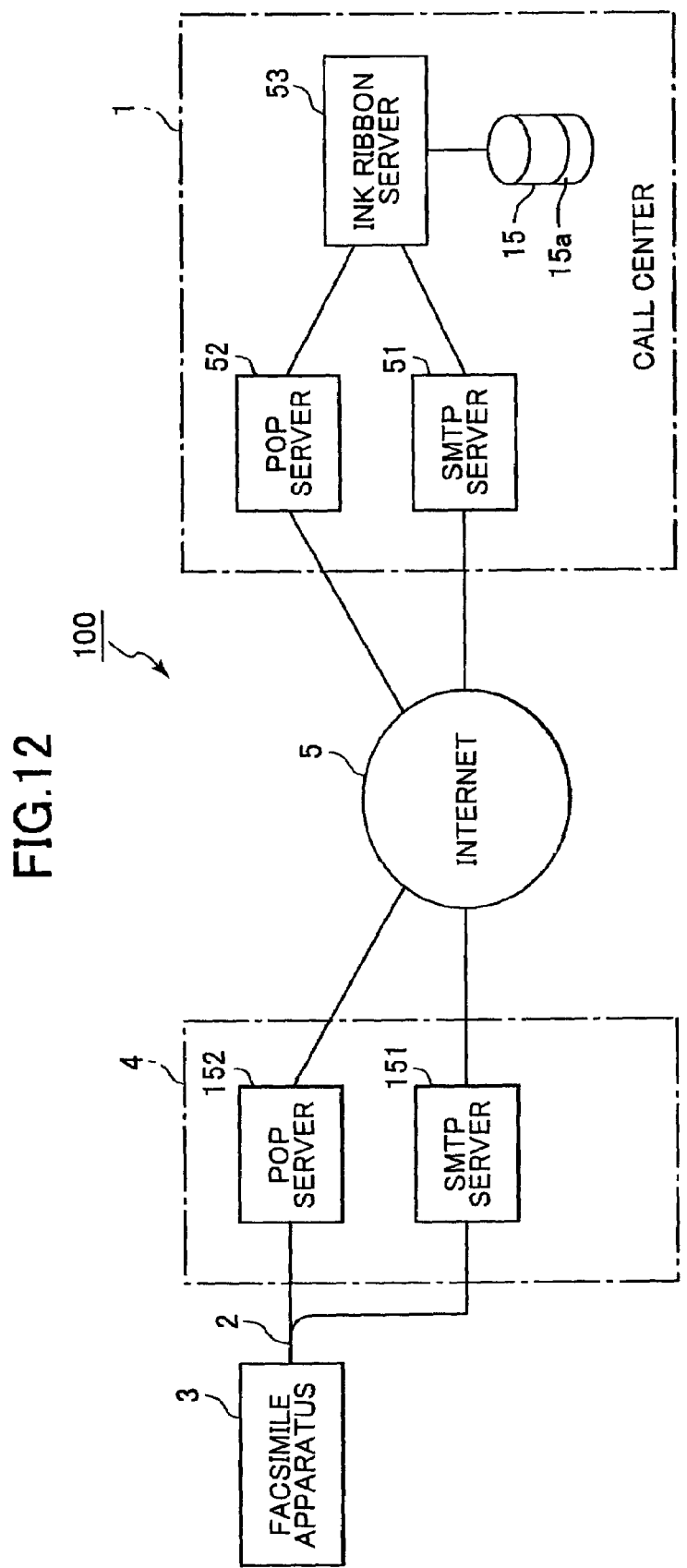
FIG. 12 is a diagram showing a communication system in accordance with a second embodiment of the present invention.

As shown in FIG. 12, a provider (ISP: Internet service provider) 4 is connectable to the facsimile apparatus 3 via the public telephone line 2. The provider 4 is provided with: an SMTP (simple mail transfer protocol) server 151 which is a server using a protocol for transmitting an electronic mail; and a POP (post office protocol) server 52 which is a server using a protocol for temporarily storing a received electronic mail.

The call center 1 is connectable to the provider 4 via the internet 5. The call center 1 is provided with a SMTP server 51 and a POP server 52. The call center 1 is further provided with an ink ribbon server 53, which is for judging whether received ribbon-ID data is valid or invalid. The ink ribbon server 53 is connected to the hard disk device 15 including the database 15a of FIG. 16.

Figure 13:
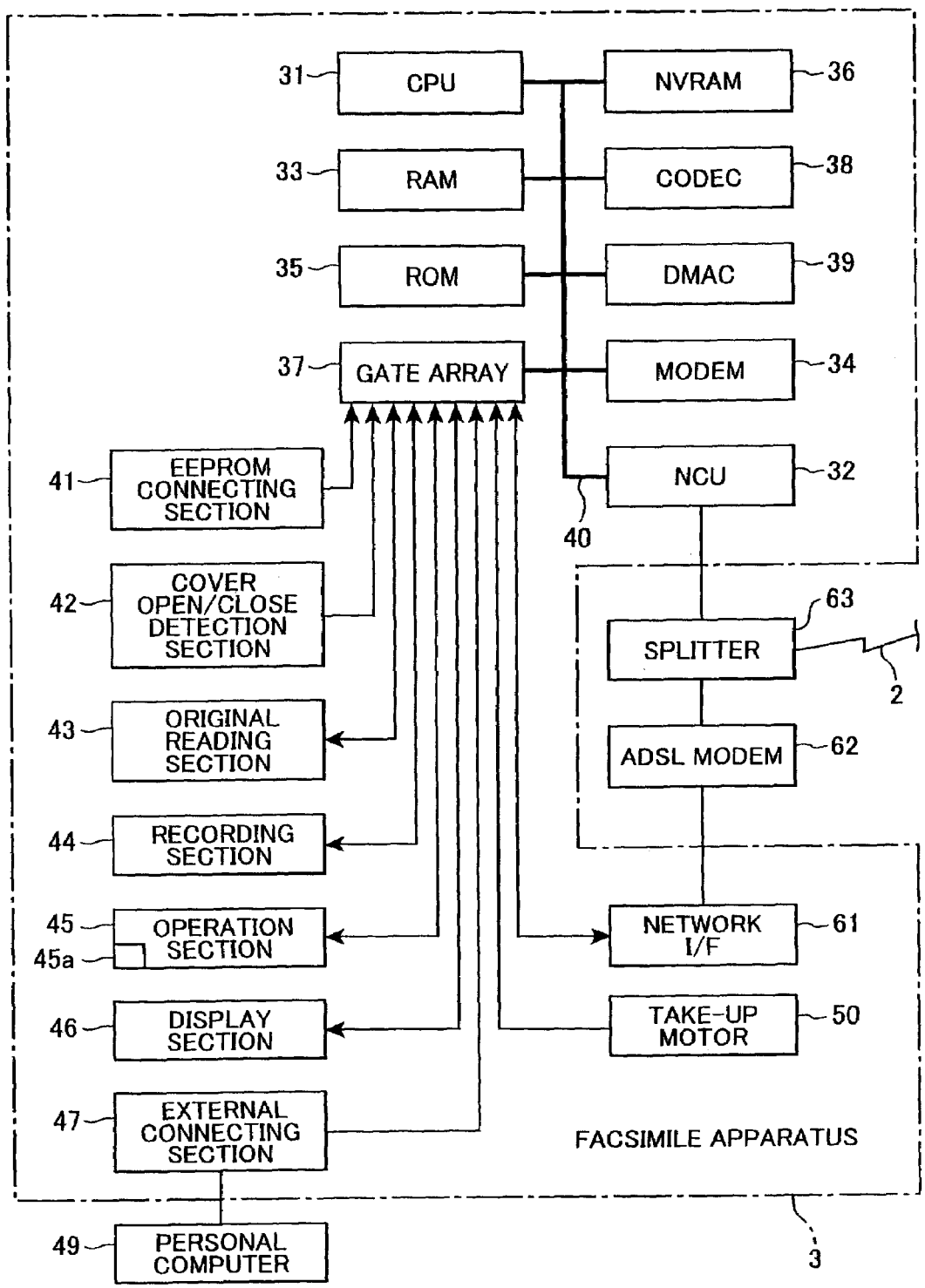
FIG. 13 is a block diagram showing an electric configuration of the facsimile apparatus in FIG. 12.

In the facsimile apparatus 3, as shown in FIG. 13, a network I/F 61, which serves as a network board to be used for transmission and reception of electronic mails, is connected to the gate array 37. The network I/F 61 is connected to, for example, an ADSL (asymmetric digital subscriber line) modem 62 in the outside of the facsimile apparatus 3. The ADSL modem 62 is connected to a splitter 63, which is provided outside the facsimile apparatus 3. The splitter 63 is connected to the NCU 32 and to the public telephone line 2. Other parts of the structure of the facsimile apparatus 3 are substantially the same as those in the structure of the facsimile apparatus 3 (FIG. 6) in the first embodiment.

The ink ribbon server 53 in the call center 1 has the same configuration with the call center 1 (FIG. 2) in the first embodiment.

In the present embodiment, data of an electronic mail address of the call center 1 is prestored in the NVRAM 36 in advance. More specifically, data of the electronic mail address of the call center 1 is stored in the NVRAM 36 by the time when the facsimile apparatus 3 is shipped out from the manufacturer. As in the second modification of the first embodiment, data of the electronic mail address of the call center 1 may be stored in the EEPROM 25 of the ribbon set S.

Additionally, the NVRAM 36 stores therein "setting of an Internet environment", that is, "a mail address of the facsimile apparatus 3", "an account name given by the provider 4", "a password corresponding to the account", and the like. These kinds of information are set and inputted in the NVRAM 36 by a user after the user purchases the facsimile apparatus 3.

According to the present embodiment, the CPU 31 of the facsimile apparatus 3 executes the initial setting processing of FIGS. 7 or 11 in the same manner as in the first embodiment or the first modification of the first embodiment except for the ink ribbon judgment processing of S5.

Figure 14:
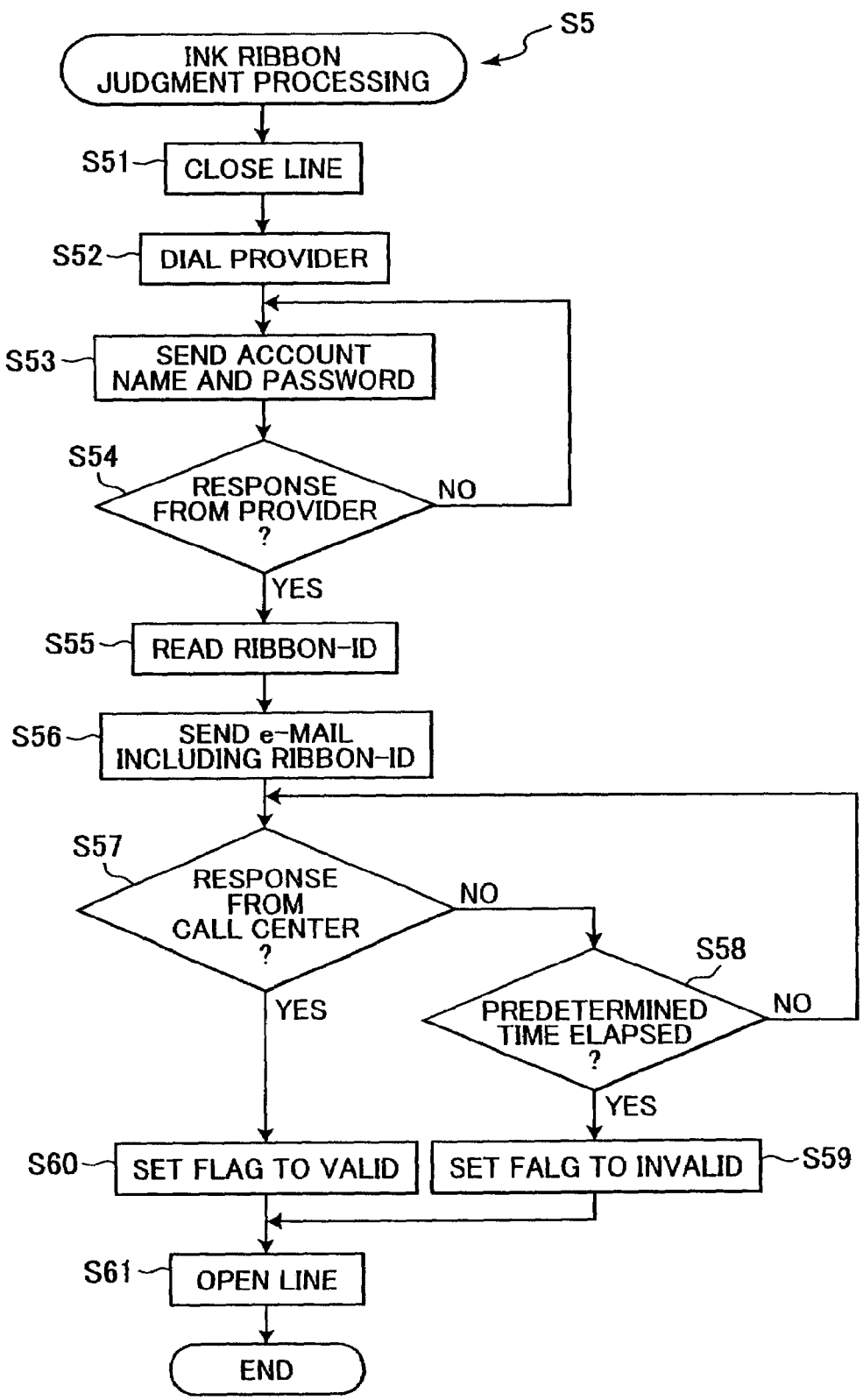
FIG. 14 is a flowchart showing an ink ribbon judgment process executed by a CPU of the facsimile apparatus in accordance with the second embodiment.

According to the present embodiment, the CPU 31 of the facsimile apparatus 3 executes the ink ribbon judgment processing of S5 as shown in FIG. 14. The call center 1 executes control processing of FIG. 15A when the facsimile apparatus 3 executes the ink ribbon judgment processing of FIG. 14.

During the ink ribbon judgment processing, the CPU 31 first closes the telephone line 2 (S51), and then dials the telephone number of the provider 4 to connect the telephone line (S52).

Subsequently, the CPU 31 reads out the account name and the password from the NVRAM 36 and sends them to the provider 4 (S53).

Subsequently, the CPU 31 judges whether or not a response (authentication) has been received from the SMTP server 151 of the provider 4 (S54). If a response is received (S54: YES), the CPU 31 reads ribbon-ID data from the EEPROM 25 (S55). The CPU 31 then creates an electronic mail including the ribbon-ID data and transmits the electronic mail to the call center 1 via the SMTP server 151 (S56). It is noted that when creating the electronic mail, the CPU 31 reads out data of the electronic mail address of the facsimile apparatus 3 from the NVRAM 36, and sets data of the electronic mail address of the apparatus 3 in a sender information ("from information") in the electronic mail. The CPU 31 sends the electronic mail to the mail address of the call center 1. As a result, the electronic mail is transmitted through the SMTP server 151 of the provider 4 to the Internet 5, and then transmitted through the Internet 5 to finally reach the POP server 52 of the call center 1.

Subsequently, the CPU 31 judges whether or not the apparatus 3 has received from the call center 1 via the POP server 152a response electronic mail informing that the ribbon-ID data transmitted to the call center 1 has been received by the call center 1 (S57). If the response electronic mail has not yet been received from the call center 1 (S57: NO), the CPU 31 judges whether or not a predetermined time has elapsed (S58). When the predetermined time has not yet elapsed (S58: NO), the program returns to the judgment processing of step S57. If the predetermined time has elapsed (S58: YES), the CPU 31 determines that the predetermined time has elapsed without receiving a response mail, recognizes that the transmitted ribbon-ID is invalid, and sets flags in both the EEPROM 25 and the NVRAM 36 to "invalid" (S59). Thereafter, the CPU 31 opens the telephone line 2 (S61).

On the other hand, when the facsimile device 3 receives a response mail (yes in S57), the CPU 31 recognizes that the transmitted ribbon-ID is valid, and sets flags in both the EEPROM 25 and the NVRAM 36 to "valid" (S60). Thereafter, the CPU 31 opens the telephone line 2 (S61).

Figure 15A:
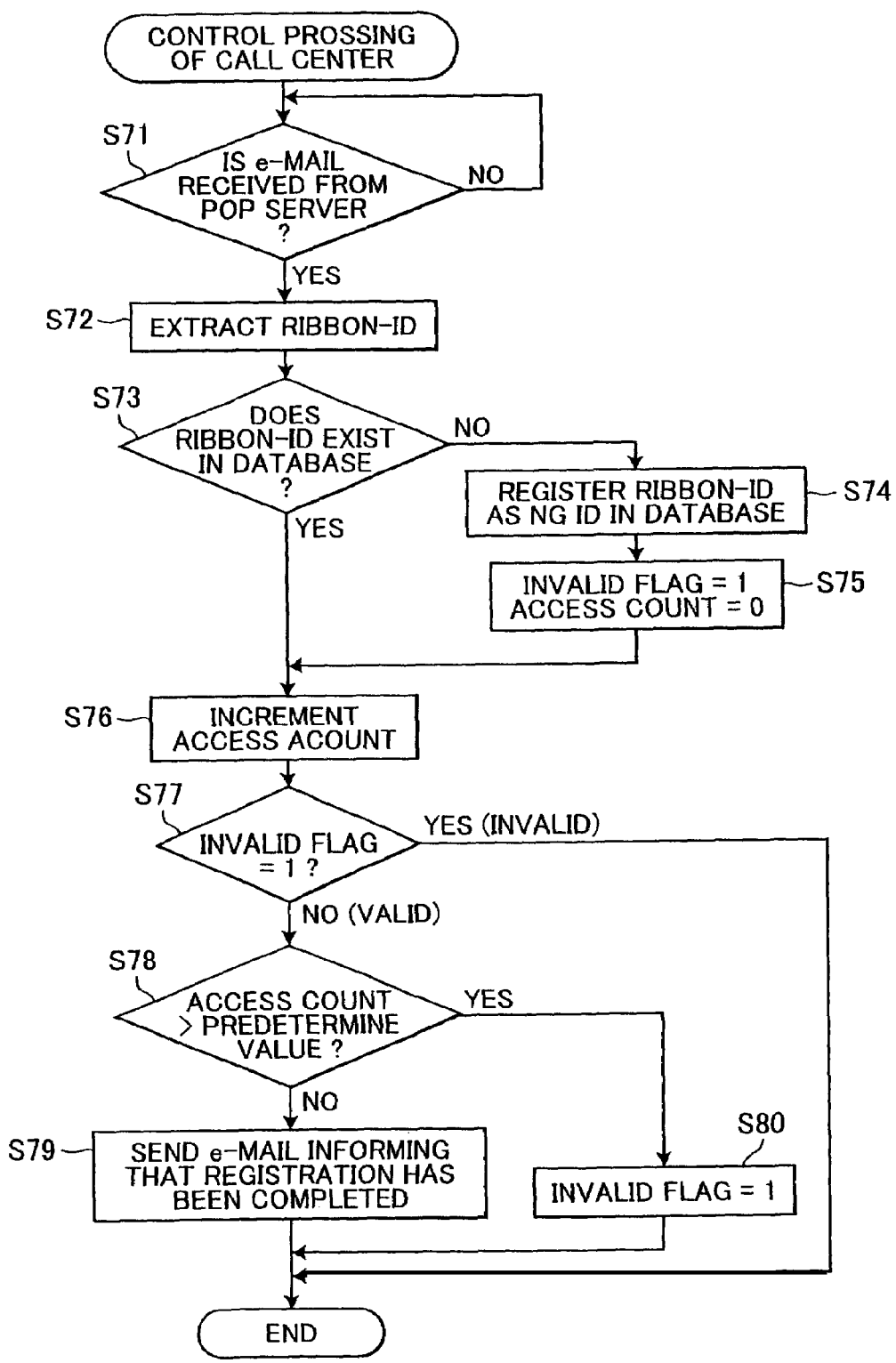
FIG. 15A is a flowchart showing a control process executed by a CPU of a call center in accordance with the second embodiment.

While the facsimile device 3 executes the above-described ink ribbon judgment processing of FIG. 14, the center 1 executes the control process of FIG. 15A.

That is, the CPU 11 judges whether or not the ink ribbon server 53 has received an electronic mail including the ribbon-ID data from the facsimile apparatus 3 via the POP server 52 (S71). It is noted that the call center 1 is always being connected to the Internet 5. If the electronic mail is received (S71: YES), the ink ribbon server 53 extracts the ribbon-ID data from the electronic mail (S72).

According to the present embodiment, as shown in FIG. 16, the database 15a stores therein the ribbon-IDs for a plurality of ink ribbons. The database 15a stores, for each ribbon-ID, an invalid flag indicative of whether the corresponding ribbon-ID is valid or invalid (valid at "0" and invalid at "1") and an access count number indicative of the number of times the call center 1 has been accessed by the corresponding ribbon-ID.

According to the present embodiment, the CPU 11 counts, for each ribbon-ID, the number of times the call center 1 has been accessed by an electronic mail including the corresponding ribbon-ID. The CPU 11 determines that a ribbon-ID in the electronic mail is invalid when the corresponding number of counts is more than a predetermined value (three, in this example) even if the corresponding invalid flag is valid ("0"). Accordingly, use of each ink ribbon will be allowed until the center 1 is accessed by the corresponding ribbon-ID the fourth time. Use of each ink ribbon will be prohibited when the center 1 is accessed by the corresponding ribbon-ID the fourth time.

More specifically, the CPU 11 compares the received ribbon-ID data set with the plurality of sets of ribbon-ID data in the database 15a, and judges whether or not the received ribbon-ID data exists in the database (S73).

If the received ribbon-ID data is not included in the database 15a (No in S73), the CPU 11 registers the received ribbon-ID data in the database 15a as NG ribbon-ID data (S74). Then, the CPU 11 sets the corresponding invalid flag to 1 and sets the corresponding access count number to 0 (S75).

On the other hand, if the received ribbon-ID data is included in the database (yes in S73), the CPU 11 increments the access count number of the subject ribbon-ID data by "1" (S76). Then, the CPU 11 judges whether or not the invalid flag for the ribbon-ID data is 1 (S77). If the invalid flag is 1 (yes in S77), the CPU 11 determines that the received ribbon-ID is invalid and ends the processing.

On the other hand, if the invalid flag is 0 (No in S77), the CPU 11 determines that the received ribbon-ID is valid, and further judges whether or not the access count number exceeds the predetermined value (3, in this example) (S78).

If the access count number exceeds the predetermined value (S78: YES), the CPU 11 sets the invalid flag to 1 (S80). The CPU 11 determines that the received ribbon-ID is invalid, and ends the processing.

On the other hand, if the access count number does not exceed the predetermined value (S75: No), the CPU 11 sends to the facsimile apparatus 3 an electronic mail informing that registration of the received ribbon-ID has been completed and therefore that the ink ribbon R presently mounted in the facsimile apparatus 3 can be used (S77). The CPU 11 sends the response electronic mail to the address that is described in the sender information ("from information") in the electronic mail that has been received from the facsimile apparatus 3 in S71.

The response electronic mail is transmitted from the ink ribbon server 53 via the SMTP server 51 of the call center 1 and the Internet 5 to the POP server 152 of the provider 4. Thereafter, the response electronic mail is transmitted to the facsimile apparatus 3 from the POP server 152.

In the above description, the CPU 11 does not respond to the facsimile apparatus 3 if the CPU 11 determines that the received ribbon-ID data is invalid. The facsimile device 3 determines that the presently-mounted ink ribbon is invalid when the predetermined time has elapsed without receiving any response mail from the call center 1. However, the call center 1 can return to the facsimile device 3 a response electronic mail informing that the received ribbon-ID is invalid. In such a case, the facsimile apparatus 3 will know that the presently-mounted ink ribbon is a non-standard one when receiving such an electronic mail.

In this way, according to the present embodiment, the CPU 11 judges whether or not the received ribbon-ID data is valid. When the ribbon-ID data is valid, the CPU 11 transmits an electronic mail informing this fact to the facsimile apparatus 3. When the facsimile apparatus 3 knows that the presently-mounted ink ribbon is a non-standard ink ribbon, the apparatus 3 executes an error processing to inform a user this fact. Therefore, it is ensured that the facsimile apparatus 3 and the user can grasp whether or not the presently-mounted ink ribbon is a standard ink ribbon easily.

In this embodiment, the facsimile apparatus 3 stores data of the e-mail address of the center device 1 in advance and performs transmission based upon the e-mail address of the center 1. Therefore, it is ensured the facsimile apparatus 3 can send ribbon-ID data to the center 1.

The center 1 receives data of the e-mail address of the facsimile apparatus 3 from the facsimile apparatus 3 and sends a response based upon the e-mail address. Therefore, it is ensured that a result of judgment can be returned to the facsimile device 3.

Figure 15B:
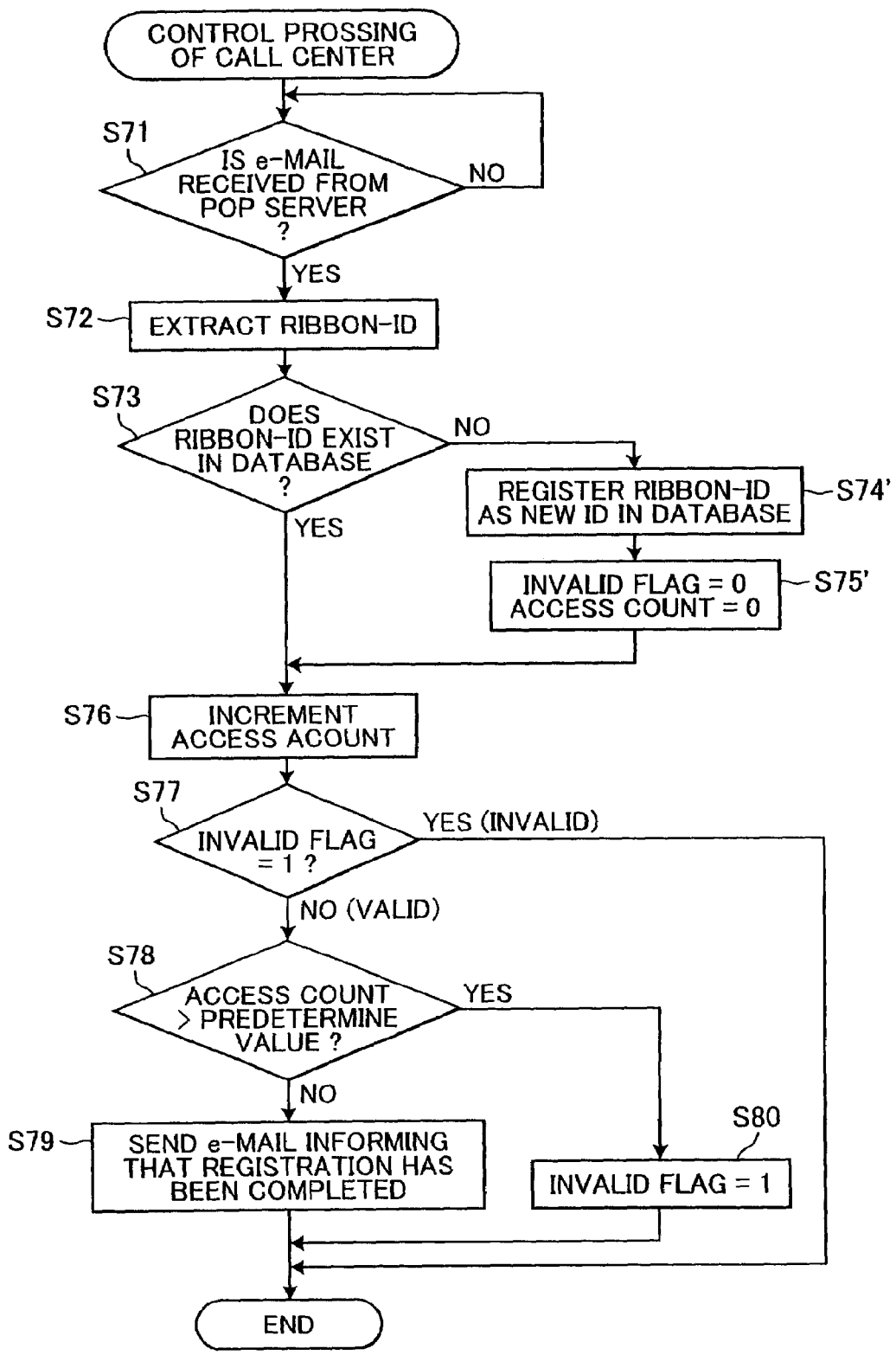
FIG. 15B is a flowchart showing a modification of the control process of FIG. 15A.

The control processing of FIG. 15A may be modified as shown in FIG. 15B. More specifically, processing of S74 and S75 may be modified into the processing of S74' and S75', respectively. That is, when the received ribbon-ID data is not included in the database 15a (No in S73), the CPU 11 registers the received ribbon-ID data in the database 15a as new ribbon-ID data (S74') and sets an invalid flag for the new ribbon-ID to 0 and sets an access count number to 0 (S75').

In addition, when receiving ribbon-ID data from the facsimile apparatus 3, the call center 1 can store in the data base 15a: date and time when the ribbon-ID data has been sent; a telephone number of a sender; an apparatus type name of the sender; country information; a model information; and an IP address (Internet Protocol address) as shown in FIG. 17. Consequently, the call center 1 can grasp how ink ribbons are being used by users.

Third Embodiment

Figure 18:
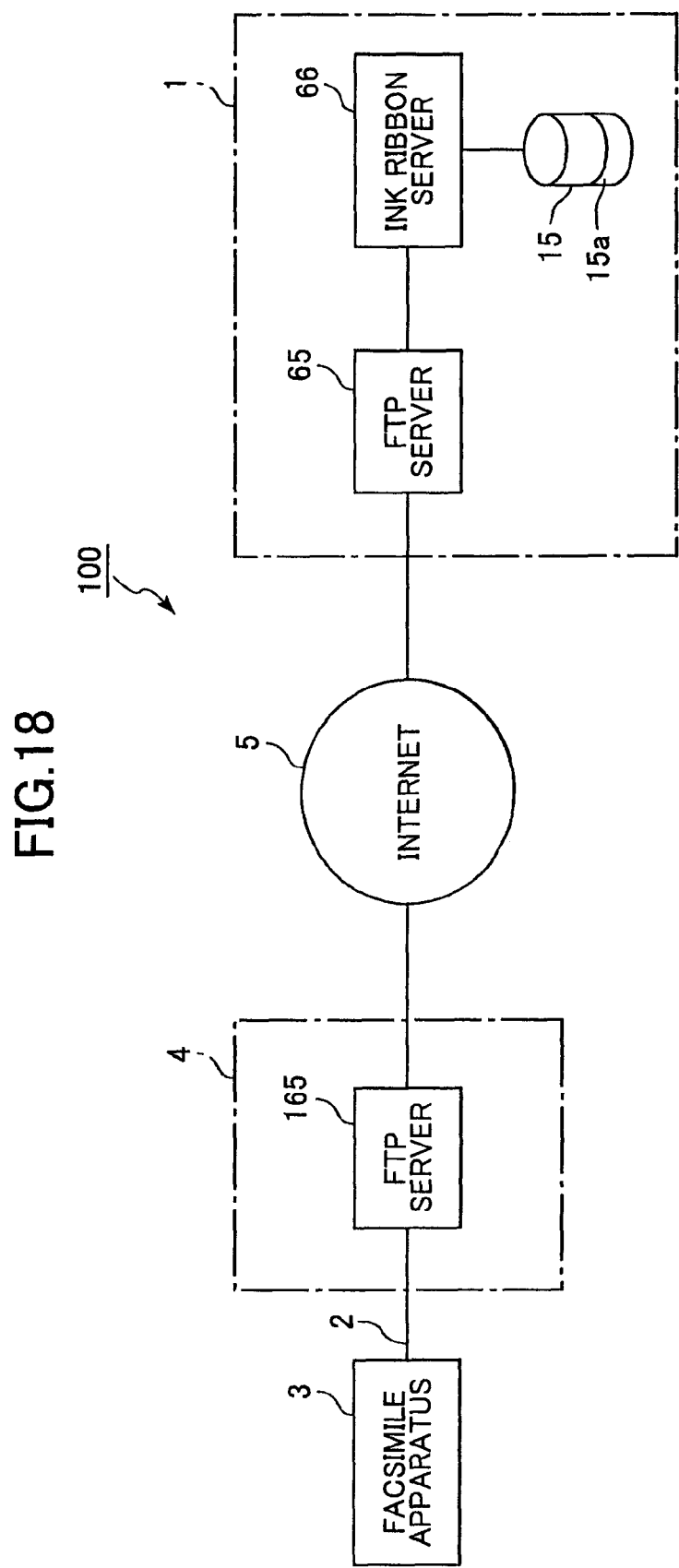
FIG. 18 is a diagram showing a communication system in accordance with a third embodiment.

In addition, the structure of the communication system 100 may be modified as shown in FIG. 18. That is, an FTP (file transfer protocol) server 165, connected to the facsimile apparatus 3 via the public telephone line 2, is provided in the provider 4. Similarly, the call center 1 is provided with a FTP server 65. An ink ribbon server 66 is connected to the FTP server 65. The hard disk device 15 is connected to the ink ribbon server 66. The hard disk device 15 has a database 15a shown in FIG. 16. The configuration of the ink ribbon server 66 is the same as that of the call center 1 (FIG. 2) of the first embodiment.

In this embodiment, ribbon-ID data is exchanged in a text file format between the facsimile apparatus 3 and the call center. 1. The center 1 and the facsimile apparatus 3 (terminal device) exchange the ribbon-ID data based upon their IP addresses (Internet Protocol addresses).

In this embodiment, the terminal device 3 and the center 1 perform processings the same as those of FIGS. 14 and 15A (or 15B) in the second embodiment except that information is exchanged in the text file format instead of an electronic mail. Therefore, the terminal device 3 performs the initial setting processing in the same manner as in FIGS. 7 or 9 of the first embodiment.

More specifically, the IP address of the center 1 is stored in advance in the NVRAM 36 of the terminal device 3 or the EEPROM 25 of the ribbon set S. In S56 (FIG. 14), the terminal 3 creates a text file including the ribbon-ID data and the IP address of the terminal device 3, and sends to the center 1 the text file based upon the IP address of the center 1.

In S79 (FIG. 15A or 15B), the center 1 sends to the facsimile device 3 a response in a text file format based upon the IP address of the terminal 3 that has been received from the terminal 3 in S71.

It is noted that, instead of the IP address, the center 1 and the terminal 3 may be specified by formats other than the IF address. For example, the center 1 and the terminal 3 may be specified by FTP, HTTP, or other information that is determined dependently on the IP address.

Incidentally, when a user intends to use a standard ink ribbon, ribbon-ID data stored in the EEPROM 25 may possibly become defective due to some cause.

In such a case, according to the present embodiment, the defective ribbon-ID data can be restored in a manner described below. That is, the ribbon-ID data is first read out from the EEPROM 25 and sent to the call center 1 from the facsimile apparatus 3. The ribbon-ID data is checked by the call center 1. If it is determined that the ribbon-ID data is defective, the call center 1 sends correct or new ribbon-ID data back to the facsimile apparatus 3. The correct ribbon-ID data is written in the EEPROM 25, whereby the ribbon-ID data is restored.

Figure 19:
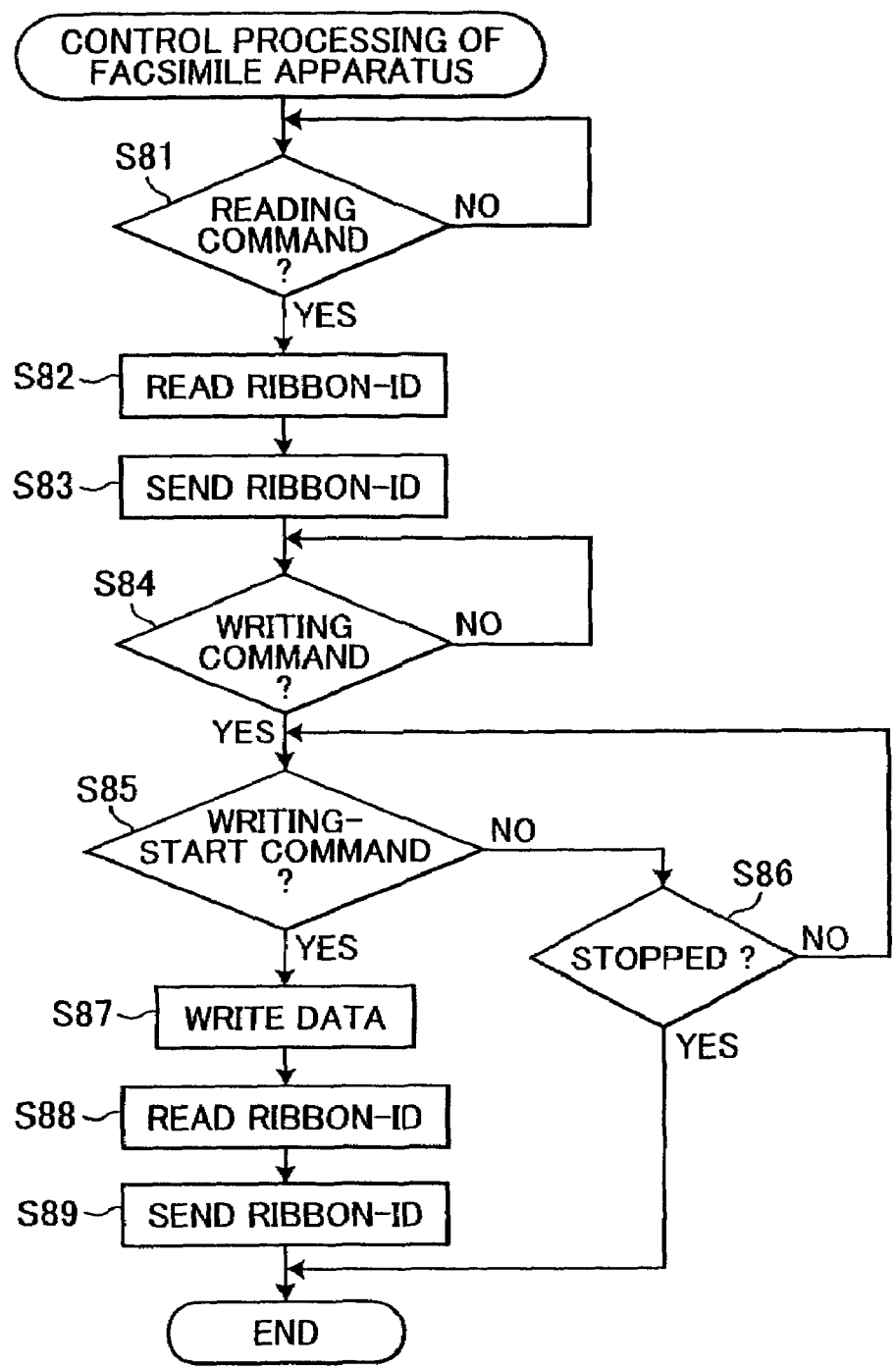
FIG. 19 is a flowchart showing a control process for restoring defective data executed by a CPU of a facsimile apparatus in accordance with the third embodiment.

In order to restore defective ribbon-ID data, the facsimile apparatus 3 executes a control procedure as shown in FIG. 19.

When an error message is displayed on the display section 46, the user contacts the call center 1 by dialing the telephone number of the call center 1 and by informing the calling center 1 the present status of the facsimile device 3.

In this case, the call center 1 sends to the facsimile apparatus 3 a command signal requesting the facsimile apparatus 3 to read out ribbon-ID data from the EEPROM 25 of the presently-mounted ink ribbon set S.

The CPU 31 of the facsimile apparatus 3 judges whether or not the apparatus 3 has received from the call center 1 a reading command requesting the facsimile apparatus 3 to read out the ribbon-ID data (S81). When the reading command is received (S81: YES), the CPU 31 reads out the ribbon-ID data from the EEPROM 25 via the EEPROM connection section 41 (S82), and sends the ribbon-ID data to the call center 1 (S83).

Consequently, the call center 1 can grasp the contents of the ribbon-ID data which has become defective due to some cause. Accordingly, the call center 1 sends to the facsimile apparatus 3 correct ribbon-ID data and a writing command requesting the facsimile apparatus 3 to write the correct ribbon-ID data.

The CPU 31 of the facsimile apparatus 3 judges whether or not the apparatus 3 has received the writing command and the correct ribbon-ID data from the call center 1 (S84). When the correct ribbon-ID data and the writing command are received from the call center 1 (S84: YES), the CPU 31 temporarily stores the correct ribbon-ID data in the RAM 33.

Then, the center 1 sends to the facsimile apparatus 3 a writing-start command signal requesting the facsimile apparatus 3 to start writing the correct ribbon-ID data in the EEPROM 25. Accordingly, in the facsimile apparatus 3, the CPU 31 judges whether or not the writing-start command signal has been received (S85).

When the writing-start command signal has not yet been received (S85: NO), the CPU 31 judges whether or not the writing is to be stopped (S86). If the writing is not to be stopped (S86: NO), the program returns to S85. If the writing is to be stopped (S56: YES), the CPU 31 ends the processing.

On the other hand, when the writing-start command signal is received (S85: YES), the CPU 31 reads out the correct ribbon-ID data from the RAM 33 and writes the correct ribbon-ID data in the EEPROM 25 (S87).

Subsequently, the CPU 31 reads out the newly-written correct ribbon-ID data from the EEPROM 25 via the EEPROM connection section 41 (S88) and transmits the correct ribbon-ID data to the call center 1 (S89).

In this way, the correct ribbon-ID data is written in the EEPROM 25 according to commands sent from the call center 1. Therefore, the user can perform satisfactory printing thereafter.

As described above, in the present embodiment, the center 1 sends to the facsimile apparatus 3 a reading command signal to request the facsimile apparatus 3 to read out ribbon-ID and return the ribbon-ID to the center 1. Then, after checking the received ribbon-ID, the center 1 further sends to the facsimile apparatus 3 a writing command signal and a writing-start command signal to request the facsimile apparatus 3 to update the defective ribbon-ID data into a correct ribbon-ID data.

In this way, the center 1 obtains the ribbon-ID of the ink ribbon R presently mounted in the facsimile apparatus 3. Then, when the ribbon-ID is defective, the center 1 sends to the facsimile apparatus 3 commands to request the facsimile apparatus 3 to rewrite the defective ribbon-ID data into correct ribbon-ID data.

Thus, in the facsimile apparatus 3, even when ribbon-ID data of a standard ink ribbon R is erroneously altered due to some cause and cannot be used satisfactorily, the ribbon-ID data can be corrected to execute normal printing.

In addition, an operator (maintenance-service operator) may visit a site where the facsimile apparatus 3 is installed and operate the apparatus 3 in order to restore the defective ribbon-ID data.

Figure 20:
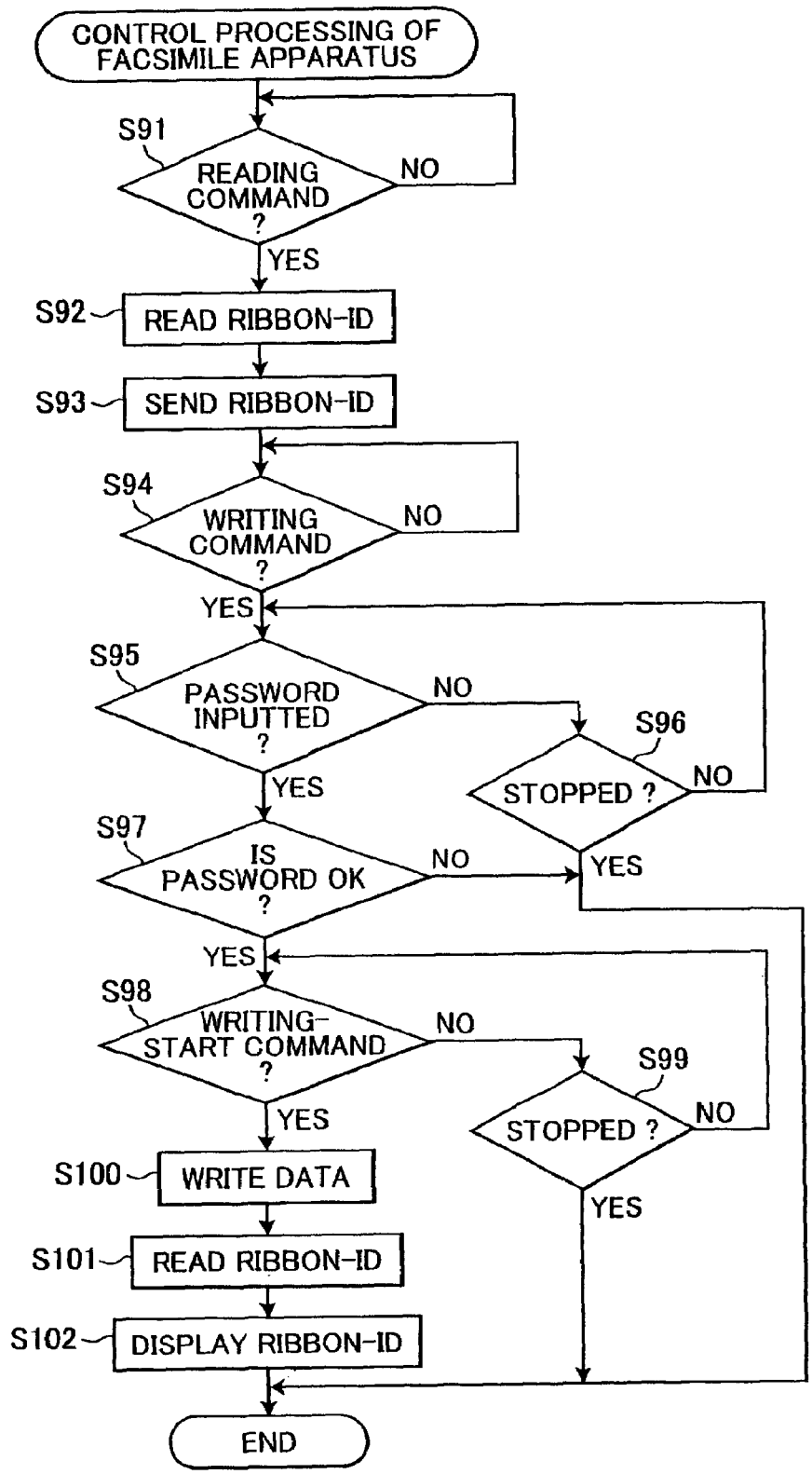
FIG. 20 is a flowchart showing the defective data restoring control process executed by a CPU of a facsimile apparatus in accordance with a modification of the third embodiment.

FIG. 20 is a flowchart showing an operation procedure executed by the CPU 31 when the operator operates the facsimile device 3 to restore the defective ribbon-ID data.

The operator first inputs to the apparatus 3 a reading command by operating the keys or the like on the operating section 45 or keys displayed on the display section 46. The CPU 31 judges whether or not the reading command has been inputted in S91.

Then, if the reading command has been inputted (S91: YES), the CPU 31 reads ribbon-ID data from the EEPROM 25 via the EEPROM connection section 41 (S92), and sends the ribbon-ID data to the call center 1 (S93).

As a result, the call center will send correct ribbon-ID data to the facsimile apparatus 3. The facsimile apparatus 3 temporarily stores the correct ribbon-ID data in the RAM 33.

Subsequently, the operator inputs to the apparatus 3 a writing command requesting the apparatus 3 to write the correct ribbon-ID data in the EEPROM 25. The operator also inputs a password into the apparatus 3. The CPU 31 judges whether or not the writing command has been inputted. If the wiring command has been inputted (S94: YES), the CPU 31 judges whether or not the password has been inputted (S95). By detecting input of password, it is possible to prevent a user from rewriting the ribbon-ID data of the EEPROM 25.

If the password has not yet been inputted (S95: NO), the CPU 31 judges whether or not the processing is to be stopped (S96). If the processing is not to be stopped (S96: NO), the program returns to step S95. If the processing is to be stopped (S96: YES), the CPU 31 ends the processing.

If the password has been inputted (S95: yes), the CPU 31 judges whether or not the inputted password is correct (S97). If the password is correct (S97: YES), the operator inputs to the apparatus 3 a writing start command signal requesting the apparatus 3 to write the correct ribbon-ID s data in the EEPROM 25.

The CPU 31 judges whether or not the writing start command signal has been inputted (S98). If the writing start command signal has not yet been inputted (S98: NO), the CPU 31 judges whether or not the processing is to be stopped (S99). If the processing is not to be stopped (S99: NO), the program returns to S98. If the processing is to be stopped (S99: YES), the CPU 31 ends the processing.

On the other hand, when the writing start command signal has been inputted (S98: YES), the CPU 31 writes the is ribbon-ID data in the EEPROM 25 (S100). Consequently, correct ribbon-ID data is inputted in the EEPROM 25.

Subsequently, the CPU 31 reads out the thus newly-inputted correct ribbon-ID data (S101) and displays the ribbon-ID data on the display section 46 (S102). Accordingly, the operator can confirm that the correct ribbon-ID data has been inputted accurately.

It is noted that the data restoration processing of FIGS. 19 and 20 can be applied to the facsimile apparatus 3 of the first and second embodiments.

While the invention has been described in detail with reference to the specific embodiments thereof, it would be apparent to those skilled in the art that various changes and modifications may be made therein without departing from the spirit of the invention.

For example, the internal structures of the call center 1 and the facsimile apparatus 3 are not limited to those described in the above-described embodiments.

In addition, a medium in which ribbon-ID data is stored is not limited to the EEPROM 25.

In addition, the conductor patterns 28 on the piece of substrate 26 are not limited to the structure described in the above-described embodiments.

In the above-described embodiments, ribbon-ID data is used to judge whether an ink ribbon R is a standard on or not. However, the ribbon-ID data may be used to judge whether a ribbon cassette 19 mounted with the ink ribbon R is a standard one or not. Another set of cassette-ID data may be prepared for identifying the ribbon cassette 19 and may be used for judging whether the ribbon cassette 19 is a standard one or not.

The present invention can be applied not only to an ink ribbon R but also to other consumable items for printing apparatuses, such as an ink cartridge for an ink jet printer, a toner cartridge for a laser printer, and a photosensitive drum unit for a laser printer.

Further, the form of transmission of the ribbon-ID data and the judged result between the call center 1 and the facsimile apparatus 3 is not limited to the above-described forms of transmission, but other various forms of transmission can be employed.

Besides the facsimile apparatus, the terminal device of the present invention can be applied to other various terminal devices in which a printing component can be mounted and which have a printing function and are connectable to a center device.

Besides the center device connectable to the facsimile apparatus, the center device of the present invention can be applied to other various types of center devices that are connectable to various terminal devices, in which printing components can be mounted and which have a printing function.

According to the above-described embodiment, ribbon-ID is stored in the EEPROM 25, and the facsimile apparatus 3 reads out the ribbon-ID from the EEPROM 25 and the center 1 analyzes the ribbon-ID. The ribbon-ID may be prepared. To include not only the manufacture lot number and the serial number but also various kinds of information concerning the ribbon R, such as a date of manufacture, a name of a manufacturing factory, a line number, and characteristic values of ink and the ink ribbon R.

Further, the EEPROM 25 may store any information of the ribbon R. The facsimile apparatus 3 reads out the information from the EEPROM 25 and the center 1 analyzes the information and notifies a user of the information. Consequently, the user can learn necessary information concerning the ribbon R. That is, the CPU 11 may analyze the information (characteristic value of an ink ribbon, for example) in the judgment step of S36 instead of judging whether or not the ribbon R is a standard product, and the CPU 31 may display a result of the analysis in S8.

It is noted that after an ink ribbon set S with a standard ink ribbon R is provided to a user, it will possibly be found later that the quality of the standard ink ribbon R is inferior. Even in such a case, the communication system 100 of the above-described embodiment can inform the is user that the ink ribbon R is defective.

It is now assumed that a design of a standard ribbon R is changed and that it is found later that the product with the new design has inappropriate quality (melting temperature of ink, for example). In such a case, the communication system 100 of the embodiment can inform the user of this fact.

More specifically, when it is found that the subject ribbon has inferior quality, the invalid flag in the database 15a for the corresponding ribbon-ID is changed into invalid ("1"). When the defective ink ribbon R is mounted to the facsimile machine 3 thereafter, the facsimile apparatus 3 will transmit the corresponding ribbon-ID to the center 1, the center 1 judges the ribbon-ID, and the facsimile apparatus 3 will notify a user, based on the judged result, that the mounted ink ribbon is defective in S8.

The communication system, the terminal device, and the center device of the present invention can be widely used in houses and offices by establishing communication lines or networks.

What is claimed is:

1. A communication system, comprising:
  a terminal device having a printing function and connectable via a communication line to a center device, the terminal device including:
    a printing unit detachably mounted with a printing component and executing a printing operation using the mounted printing component, the printing component having a storage portion storing information of the printing component;
    a reading unit that reads the information of the printing component from the storage portion of the printing component mounted in the printing unit; and
    a transmission unit that transmits the information read by the reading unit to the center device via the communication line to cause the center device to execute judgment operation based on the information, and
  the center device including:
    a receiving unit that receives the information sent from the terminal device via the communication line;
    a judging unit that executes the judgment operation based on the information received by the receiving unit; and
    a reply unit that returns a result of judgment by the judging unit to the terminal device,
  wherein the storage portion of the printing component stores identification information of the printing component, and
  wherein the judging unit judges whether or not the printing component is a standard printing component, based on the received identification information and on a number of times the identification information is received.

2. A communication system as claimed in claim 1, wherein the terminal device further includes:
  a receiving unit that receives a judged result sent from the center device; and
  a control unit that writes the received result of judgment in the storage portion of the printing component, and that performs a predetermined operation based upon the written result of judgment.

3. A communication system as claimed in claim 2, wherein the control unit executes an error process selectively based upon the written result of judgment, the error process prohibiting the printing unit from performing printing operation.

4. A communication system as claimed in claim 1, wherein the center device further includes an identification-information storage unit that stores, for each of a plurality of printing components, a set of identification information and information whether or not the corresponding printing component is a standard printing component, wherein the judging unit makes the judgment by comparing the identification information received by the receiving unit with the plural sets of identification information stored in the storage unit, thereby determining whether the mounted printing component is a standard printing component.

5. A communication system as claimed in claim 1, wherein the terminal device further includes an e-mail address storage portion that stores an e-mail address of the center device, wherein the transmission unit transmits an e-mail address of the terminal device and the information read by the reading unit to the center device based upon the e-mail address of the center device, and wherein the reply unit returns the result of judgment based upon the e-mail address of the terminal device sent from the terminal device.

6. A communication system as claimed in claim 1, wherein the terminal device further includes an IP address storage portion that stores an IP address of the center device, wherein the transmission unit transmits an IP address of the terminal device and the information read by the reading unit to the center device based upon the IP address of the center device, and wherein the reply unit returns the result of judgment based upon the IP address of the terminal device sent from the terminal device.

7. A communication device as claimed in claim 1, wherein the terminal device further includes a power switch turning on power of the terminal device, the reading unit executing the reading operation when the power switch is turned on.

8. A communication device as claimed in claim 1, wherein the terminal device further includes:

a cover that is openable and closable to enable the printing component to be changed with another printing component; and a cover-state detecting portion detecting whether or not the cover is closed from its opened state, and wherein the reading unit executes the reading operation when the cover-state detecting portion detects that the cover is closed from the opened state.

9. A communication system, comprising:

a terminal device having a printing function and connectable via a communication line to a center device, the terminal device including:

a printing unit detachably mounted with a printing component and executing a printing operation using the mounted printing component, the printing component having a storage portion storing information of the printing component;

a reading unit that reads the information of the printing component from the storage portion of the printing component mounted in the printing unit; and a transmission unit that transmits the information read by the reading unit to the center device via the communication line to cause the center device to execute judgment operation based on the information, and the center device including:

a receiving unit that receives the information sent from the terminal device via the communication line;

a judging unit that executes the judgment operation based on the information received by the receiving unit; and a reply unit that returns a result of judgment by the judging unit to the terminal device, wherein the terminal device further includes a telephone-number storage portion that stores a telephone number of the center device, and wherein the transmission unit transmits the information read by the reading unit to the center device by closing a telephone line between the terminal device and the center device based upon the telephone number of the center device.

10. A communication system as claimed in claim 9, wherein the reply unit returns the result of judgment over the telephone line that has been closed by the transmission unit of the terminal device.

11. A communication system as claimed in claim 9, wherein the transmission unit of the terminal device transmits a telephone number of the terminal device and the information read by the reading unit to the center device, the transmission unit opening the telephone line after transmitting the telephone number and the information, and wherein the reply unit of the center device returns the result of judgment by closing the telephone line between the center device and the terminal device based upon the telephone number of the terminal device sent from the transmission unit of the terminal device.

12. A communication system comprising:

a terminal device having a printing function and connectable via a communication line to a center device, the terminal device including:

a printing unit detachably mounted with a printing component and executing a printing operation using the mounted printing component, the printing component having a storage portion storing information of the printing component;

a reading unit that reads the information of the printing component from the storage portion of the printing component mounted in the printing unit; and a transmission unit that transmits the information read by the reading unit to the center device via the communication line to cause the center device to execute judgment operation based on the information, and the center device including:

a receiving unit that receives the information sent from the terminal device via the communication line;

a judging unit that executes the judgment operation based on the information received by the receiving unit; and a reply unit that returns a result of judgment by the judging unit to the terminal device, wherein the center device further includes a read command transmission unit that transmits, to the terminal device, a read command signal requesting the terminal device to read out the information of the printing component from the storage portion and to return the read information to the center device, wherein the terminal device further includes a read-and-reply unit that, upon receipt of the read command signal transmitted from the center device, reads out the information of the printing component from the storage portion and returns the information to the center device, wherein the center device further includes an update command transmission unit that transmits to the terminal device, upon receipt of the information transmitted from the terminal device, correct information and an update command signal requesting the terminal device to update the information of the printing component stored in the storage portion into the correct information, and wherein the terminal device further includes an updating unit that updates, upon receipt of the update command signal, the information of the printing component stored in the storage portion into the correct information.

13. A communication system, comprising:

a terminal device having a printing function and connectable via a communication line to a center device, the terminal device including:

a printing unit detachably mounted with a printing component and executing a printing operation using the mounted printing component, the printing component having a storage portion storing information of the printing component;

a reading unit that reads the information of the printing component from the storage portion of the printing component mounted in the printing unit; and a transmission unit that transmits the information read by the reading unit to the center device via the communication line to cause the center device to execute judgment operation based on the information, and the center device including:

a receiving unit that receives the information sent from the terminal device via the communication line;

a judging unit that executes the judgment operation based on the information received by the receiving unit; and a reply unit that returns a result of judgment by the judging unit to the terminal device, wherein the terminal device further includes:

an input unit manually operated to receive a read command signal requesting the terminal device to read out the information of the printing component from the storage portion and to send the read information to the center device; and a read-and-send unit that, upon receipt of the read command inputted into the input unit, reads out the information of the printing component from the storage portion and sends the information to the center device, wherein the center device further includes a correct information transmission unit that transmits correct information to the terminal device upon receipt of the information transmitted from the terminal device, and wherein the input unit is manually operated to further receive an update command requesting the terminal device to update the information of the printing component presently stored in the storage portion into the correct information, and wherein the terminal device further includes an updating unit that updates, upon receipt of the update command, the information of the printing component stored in the storage portion into the correct information.

* * * * *